United States Patent
Chen et al.

(10) Patent No.: US 12,216,677 B2
(45) Date of Patent: Feb. 4, 2025

(54) GENERATING DATA INSIGHTS

(71) Applicant: ADOBE INC., San Jose, CA (US)

(72) Inventors: Chen Chen, Rockville, MD (US); Jane Elizabeth Hoffswell, Seattle, WA (US); Shunan Guo, San Jose, CA (US); Fan Du, Milpitas, CA (US); Nathan Carl Ross, Highland, UT (US); Ryan A. Rossi, San Jose, CA (US); Yeuk Yin Chan, Santa Clara, CA (US); Eunyee Koh, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 18/328,980

(22) Filed: Jun. 5, 2023

(65) Prior Publication Data
US 2024/0403313 A1  Dec. 5, 2024

(51) Int. Cl.
G06F 16/26  (2019.01)
G06F 3/0482  (2013.01)
G06F 16/248  (2019.01)
G06T 11/20  (2006.01)

(52) U.S. Cl.
CPC ............ *G06F 16/26* (2019.01); *G06F 16/248* (2019.01); *G06T 11/206* (2013.01); *G06F 3/0482* (2013.01)

(58) Field of Classification Search
CPC ...... G06F 16/28; G06F 16/248; G06F 3/0482; G06T 11/206
See application file for complete search history.

(56) References Cited

U.S. PATENT DOCUMENTS

2018/0254101 A1 *  9/2018  Gilmore ................. G16H 15/00

OTHER PUBLICATIONS

Kery, et al., "Variolite: Supporting Exploratory Programming by Data Scientists", In CHI, (May 2017), (vol. 10, pp. 3-025).
Lee, et al., "Lux: Always-on Visualization Recommendations for Exploratory Dataframe Workflows", arXiv preprint arXiv:2105.00121v2 [cs.DB] Dec. 22, 2021, 15 pages.
Srinivasan, et al., "Snowy: Recommending Utterances for Conversational Visual Analysis", In The 34th Annual ACM Symposium on User Interface Software and Technology (2021), pp. 864-880.
Srinivasan, et al., "Augmenting Visualizations with Interactive Data Facts to Facilitate Interpretation and Communication", IEEE Transactions on Visualization and Computer Graphics vol. 25, No. 1, Jan. 2019, pp. 672-681.
Li, et al., "EDAssistant: Supporting Exploratory Data Analysis in Computational Notebooks with In-Situ Code Search and Recommendation", arXiv preprint arXiv:2112.07858v1 [cs.HC] Dec. 15, 2021, 25 pages.

(Continued)

*Primary Examiner* — Etienne P Leroux
(74) *Attorney, Agent, or Firm* — F. CHAU & ASSOCIATES, LLC

(57) ABSTRACT

Systems and methods for data analysis are described. Embodiments of the present disclosure data analysis include displaying, via a data analysis interface, a data visualization in a first region of the data analysis interface; and displaying, via the data analysis interface, an analysis thread visualization in a second region of the data analysis interface. The analysis thread visualization depicts an analysis thread graph including a first node corresponding to the data visualization and an edge corresponding to an analysis path between the first node and a second node.

17 Claims, 17 Drawing Sheets

(56) References Cited

OTHER PUBLICATIONS

Satyanarayan, et al., "Vega-Lite: A Grammar of Interactive Graphics", IEEE Trans. Visualization & Comp. Graphics (Proc. InfoVis) (2017) 10 pages, found on the internet at: URL: http: //idl.cs.washington.edu/papers/vega-lite.

* cited by examiner

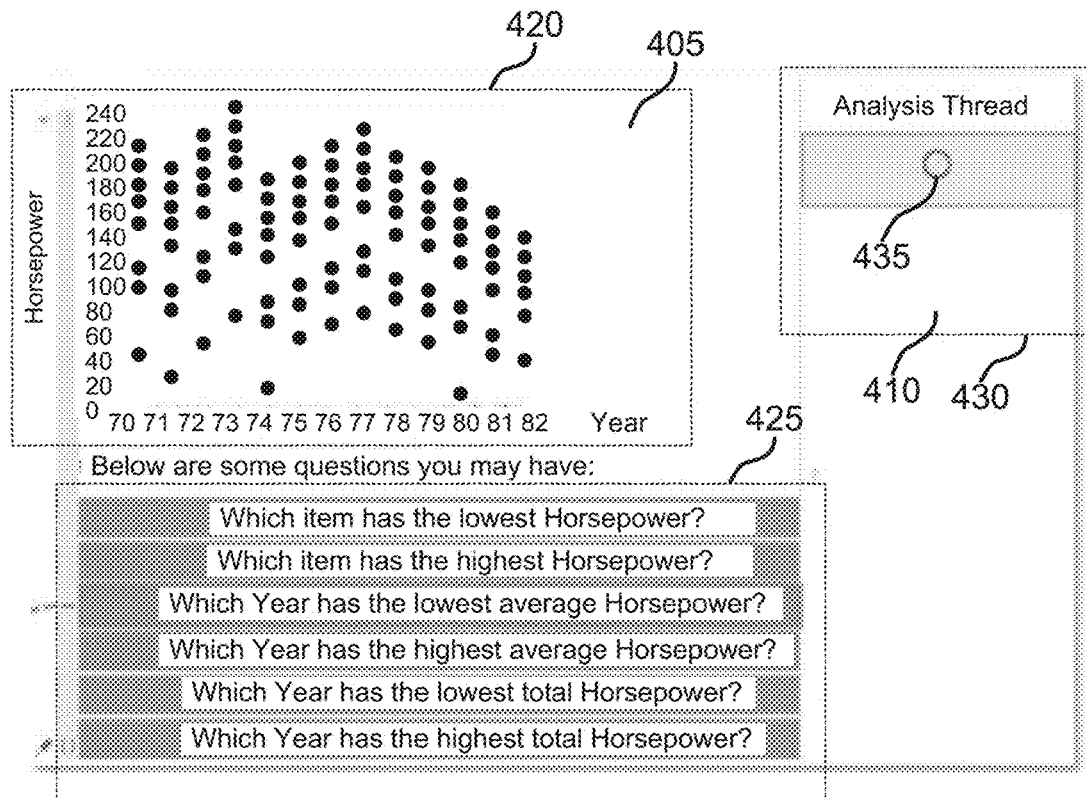
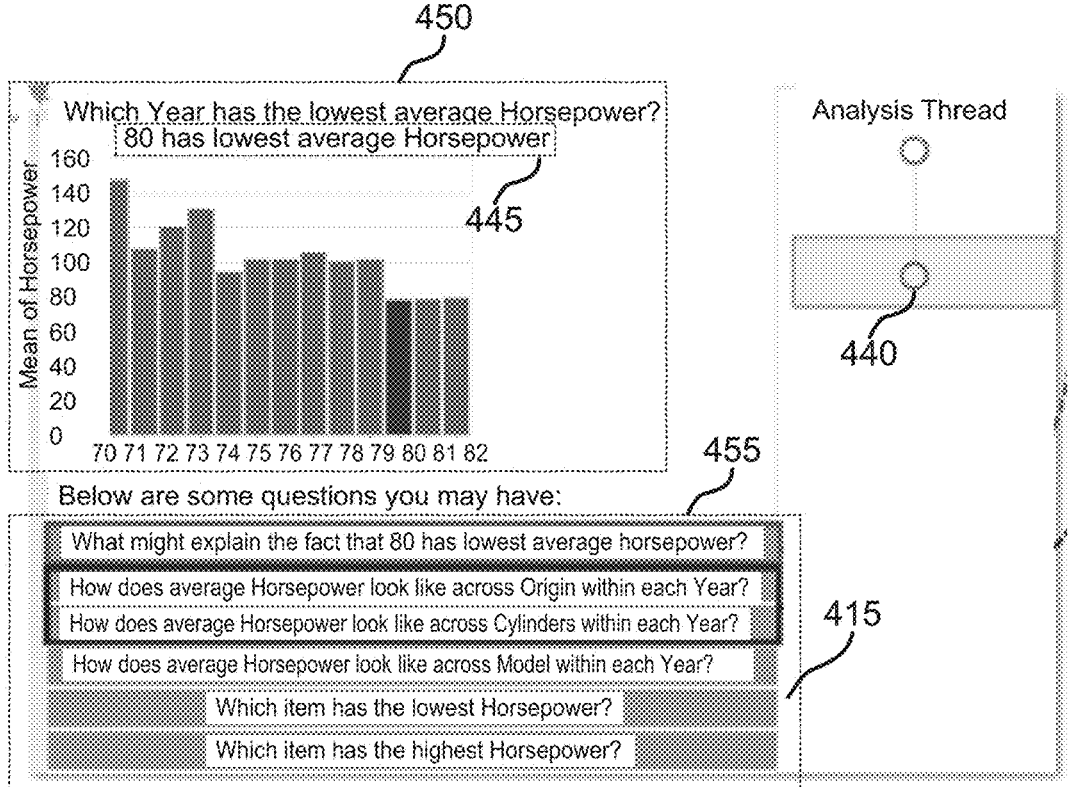
FIG. 4

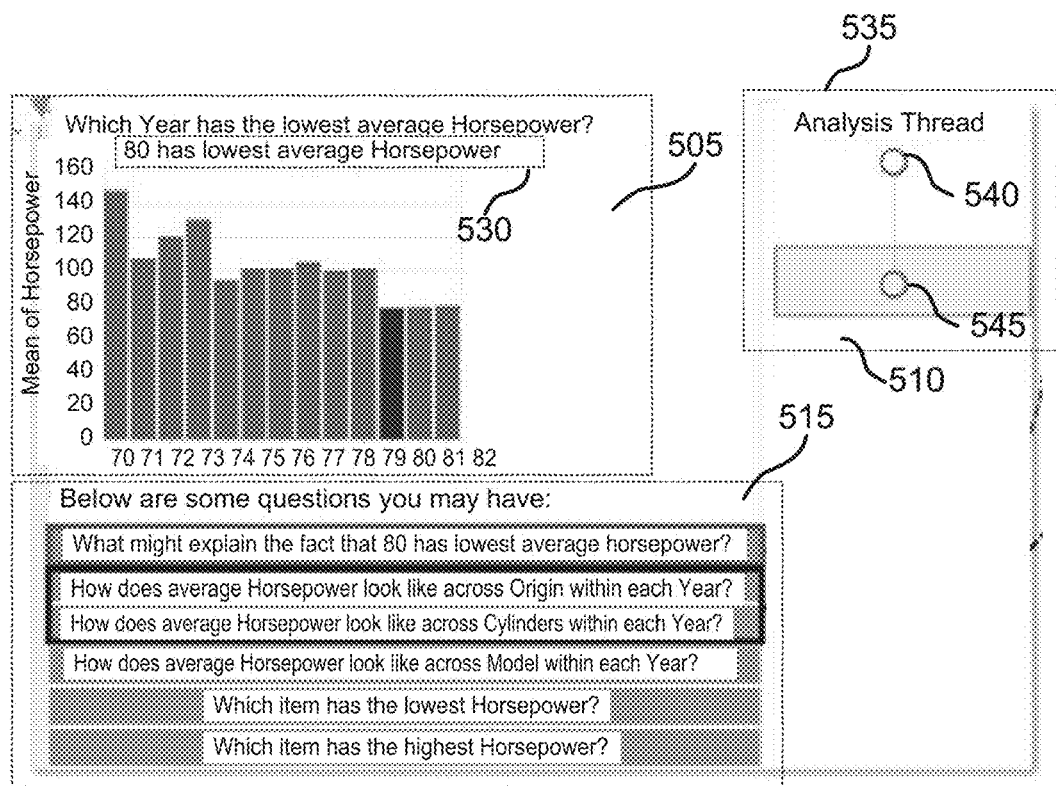
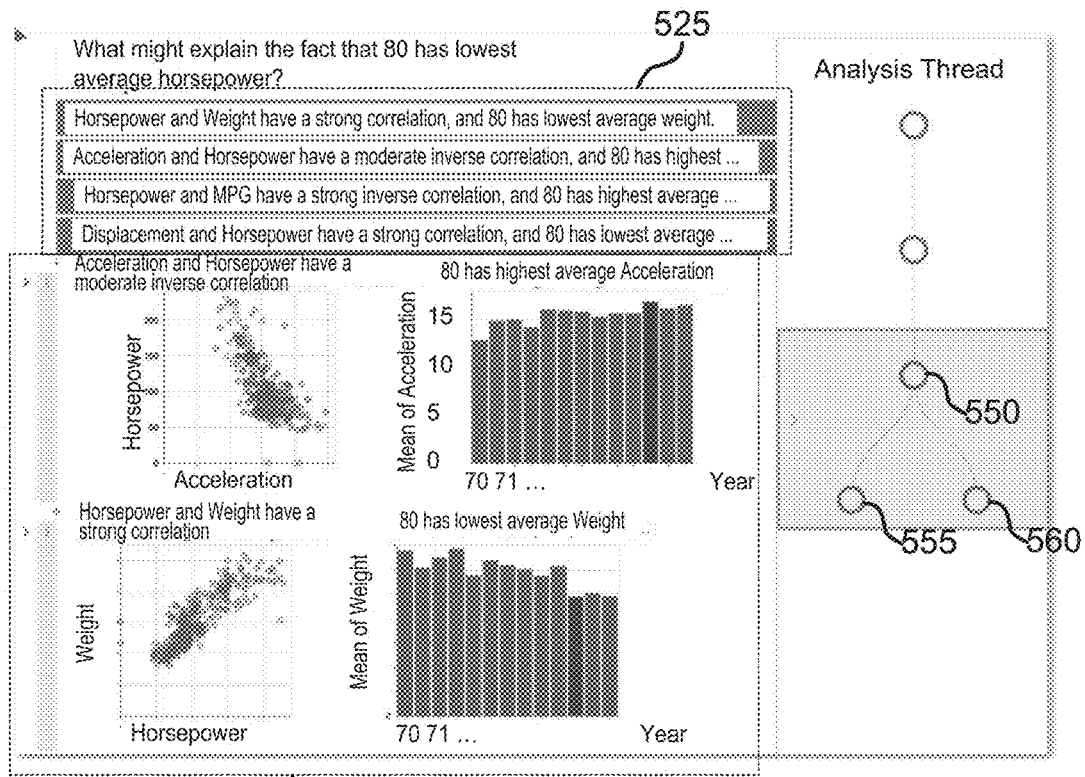
FIG. 5

Algorithm 1: Question Retrieval

Data: The current insight $cIn$ and the insight set $InSet$.
Result: Retrieved set of questions $questionSet$.
$lgInSet \leftarrow$ insightSearch($cIn, InSet$) based on Table 1;
$atInSet \leftarrow \{\}$;
$atCombs \leftarrow \{atComb \mid atComb \cap cIn.attributes \neq \emptyset \}$;
for $atComb \in atCombs$ do
    $atInSet$
      $\leftarrow atInSet \cup \{in \mid in \in InSet \ \& \ in.attributes = atComb\}$
end
$questionSet \leftarrow$ questionConvertor($lgInSet$);
for $level \in [1,2,3]$ do
    $thisLvSet \leftarrow \{in \mid in \in atInSet \ \& \ in.tier = level\}$;
    $questionSet$
      $\leftarrow questionSet \cup$ questionConvertor($thisLvSet$);
end

FIG. 16

GENERATING DATA INSIGHTS

BACKGROUND

The following relates generally to data processing, and more specifically to explanatory data analysis (EDA). Data processing refers generally to the use of a computer to parse, modify, store, and transform data into different forms. Explanatory data analysis is a type of data processing that uses computer software (e.g., Jupyter Notebook) to transform complex datasets into intuitive representations for data exploration. Such representations (e.g., question and answering, data visualization) facilitate discovery and communication of data insights. In some cases, users can type in codes in a notebook environment to generate data summarization related to the dataset such as text, tables, charts, etc. The types of visualizations and information generated may depend on the input dataset and configurations.

However, some users may need assistance with coding and guidance on data exploration in a notebook environment. For example, a user who is unfamiliar with programming may be interested in insight-based user guidance for data exploration. Therefore, there is a need in the art for data analysis systems that provide an interactive and accessible data exploration environment.

SUMMARY

The present disclosure describes systems and methods for data analysis. Embodiments of the present disclosure include a data analysis apparatus configured to display a data visualization in a first region of a data analysis interface. The data analysis apparatus displays an analysis thread visualization in a second region of the data analysis interface. In some examples, the data analysis apparatus transforms an input dataset to a visualization (e.g., a chart) where a set of next-step questions or follow-up questions are generated based on the visualization and user input. Additionally, the data analysis apparatus displays an interactive analysis thread visualization that enables visualization of the exploration process and relations among the cell nodes. In some cases, the analysis thread visualization depicts an analysis thread graph (e.g., a tree structure) including a first node corresponding to the data visualization and an edge corresponding to an analysis path between the first node and a second node.

A method, apparatus, and non-transitory computer readable medium for data analysis are described. One or more embodiments of the method, apparatus, and non-transitory computer readable medium include displaying, via a data analysis interface, a data visualization in a first region of the data analysis interface and displaying, via the data analysis interface, an analysis thread visualization in a second region of the data analysis interface, wherein the analysis thread visualization depicts an analysis thread graph including a first node corresponding to the data visualization and an edge corresponding to an analysis path between the first node and a second node.

A method, apparatus, and non-transitory computer readable medium for data analysis are described. One or more embodiments of the method, apparatus, and non-transitory computer readable medium include generating an analysis thread graph including a first node corresponding to a data visualization and an edge corresponding to an analysis path between the first node and a second node; displaying the data visualization in a first region of a data analysis interface; and displaying an analysis thread visualization in a second region of the data analysis interface.

An apparatus and method for data analysis are described. One or more embodiments of the apparatus and method include at least one processor; at least one memory storing instructions executable by the at least one processor; a graph component configured to generate an analysis thread graph including a first node corresponding to a data visualization and an edge corresponding to an analysis path between the first node and a second node; and a data analysis interface configured to display the data visualization in a first region of the data analysis interface and an analysis thread visualization in a second region of the data analysis interface.

BRIEF DESCRIPTION OF THE DRAWINGS

FIGS. 4, 5, 6, 7, 8, 9, and 10 show examples of a data analysis interface according to aspects of the present disclosure.

FIG. 16 shows an example of a question retrieval algorithm according to aspects of the present disclosure.

DETAILED DESCRIPTION

Figure 1:
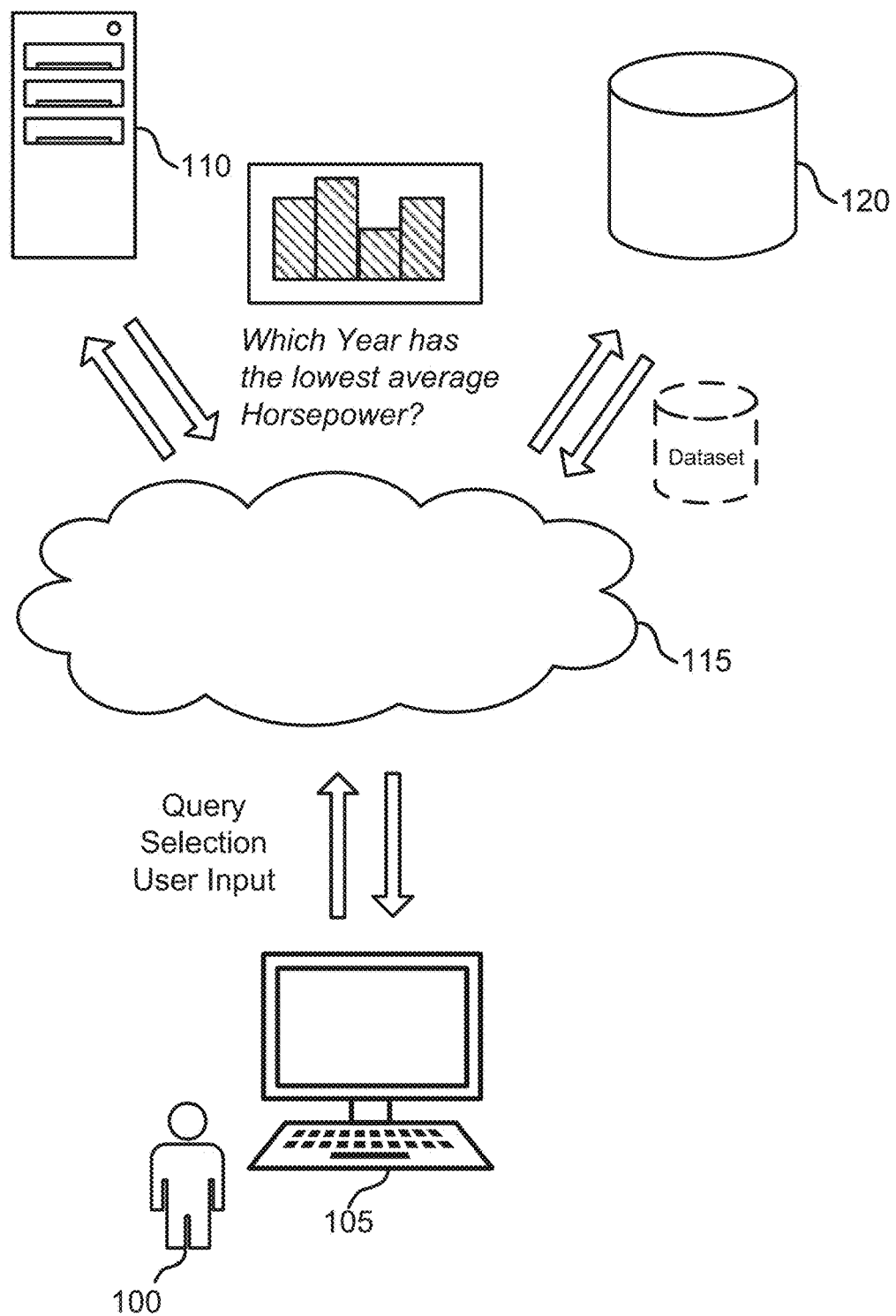
FIG. 1 shows an example of a data analysis system according to aspects of the present disclosure.

The present disclosure describes systems and methods for data analysis. Embodiments of the present disclosure include a data analysis apparatus configured to display a data visualization in a first region of a data analysis interface. The data analysis apparatus displays an analysis thread visualization in a second region of the data analysis interface. In some examples, the data analysis apparatus transforms an input dataset to a visualization (e.g., a chart) where a set of next-step questions or follow-up questions are generated based on the visualization and user input. Additionally, the data analysis apparatus displays an interactive analysis thread visualization that enables the visualization of the exploration process and parent-child relations among the cell nodes. In some cases, the analysis thread visualization depicts an analysis thread graph (e.g., a tree structure) including a first node corresponding to the data visualization and an edge corresponding to an analysis path between the first node and a second node.

Recently, computational notebooks such as Jupyter Notebook and RStuido allow users to perform exploratory data analysis. With computational notebooks, users can combine code, text, visualizations, and tables inside the same environment. By programming or modifying the codes, different information can be extracted from the source data (e.g., a dataset of interest). However, conventional method is code intensive and presents difficulty for non-technical users who are not familiar with programming. Moreover, the notebook environment follows a linear structure and a large number of new cells are created after a period of data exploration. It is difficult to keep track of the hierarchy and relations of the cells and navigating the notebook environment can be challenging and time-consuming.

Embodiments of the present disclosure include a data analysis apparatus configured to display an interactive notebook-based region (a first region) and an analysis thread visualization (a second region). The data analysis apparatus, via a data analysis interface, is configured for data exploration, question recommendations, and cell tracing. The data analysis apparatus includes an interactive data analysis model that is notebook-based. The data analysis model takes a dataset as input and transforms the dataset into an initial visualization.

In some embodiments, the data analysis model generates a set of next-step questions, via next-step recommendation heuristic, based on the dataset and the initial visualization. The data analysis apparatus runs heuristic algorithms that combine insight-based recommendation (i.e., starting from a visualization reflecting a specific data insight, searching for logically-related insights, and recommending them in the form of a follow-up question) and attribute-based recommendation (i.e., introducing insightful data attributes that are not fully explored) to guide data exploration. A user interacts with insight-related questions. After receiving user input (e.g., a user selects a query from candidate queries), the data analysis model generates text information (e.g., answer to the question) and an additional data visualization (e.g., a bar chart depicting the answer).

In some embodiments, the data analysis model includes an interactive visualization panel (e.g., a visualization tree) to enable convenient analysis history browsing and quick navigation between different analysis threads. This way, users have increased awareness and control of the structure of their data exploration process. For example, a user can visualize notebook cells based on the analysis hierarchy to trace back through the history of the data exploration process and can be re-directed to a target cell containing a data visualization or a list of queries efficiently.

In some embodiments, a data analysis interface displays a data visualization in a first region of the data analysis interface. The data analysis interface displays an analysis thread visualization in a second region of the data analysis interface. The analysis thread visualization depicts an analysis thread graph including a first node corresponding to the data visualization and an edge corresponding to an analysis path between the first node and a second node. For example, the first region is located on a left-hand side of the data analysis interface and the first region includes one or more notebook cells. The second region is located on a right-hand side of the data analysis interface and the second region includes the analysis thread graph (e.g., a tree structure graph). The first node corresponds to a data visualization such as a plot chart depicting relationships between two attributes, horsepower and year. The second node corresponds to a question from a set of questions which are generated and recommended to a user for exploration. A third node corresponds to another question from the set of questions. Each of the rest of the questions corresponds to a node that is considered a sibling node of the second node (e.g., the second node and the third node are sibling nodes).

By combining an interaction panel that populates follow-up questions based on the current visualization and an interactive dynamic analysis thread visualization (e.g., the tree structure) that reflects the dependencies between the cells, users can efficiently examine the overall notebook structure, view the correspondence between cells and nodes, open the recommendation panel of a specific cell, and restore deleted cells through interaction with the analysis thread visualization. Moreover, the data analysis apparatus enables a low-code data exploration model and users gain increased control over the notebook cells and their associated visualization outcome based on the analysis hierarchy.

As used herein, "data visualization" refers to a graph visualization generated based on a source dataset. In some examples, the source dataset includes a set of data samples. The graph visualization may be a bar chart, a plot chart, etc. The data visualization is presented, via a data analysis interface, in a first region of the data analysis interface. For example, the data visualization shows year on x-axis and horsepower on y-axis. The first region of the data analysis interface is located in a first cell of a notebook environment.

As used herein, "analysis thread visualization" refers to a graph visualization depicting an analysis path at exploratory data analysis in a notebook environment. An analysis thread visualization is located in a second region of the data analysis interface. The analysis thread visualization depicts an analysis thread graph including a first node corresponding to the data visualization mentioned above and an edge corresponding to an analysis path between the first node and a second node.

As used herein, "analysis thread graph" refers to an analysis structure that includes a set of nodes and a set of edges, where a node of the nodes corresponds to a cell in a notebook environment and an edge of the edges corresponds to an analysis path between a first node and a second node. The analysis thread graph includes an additional edge corresponding to an additional analysis path between the first node and a third node. The third node is a sibling node of the second node if the second node and the third node share a same parent node (e.g., the first node is the parent node) and the second node and the third node are located on a same level of the analysis thread graph.

Embodiments of the present disclosure may be used in the context of data analysis and data exploration applications. For example, a data analysis model based on the present disclosure may take an initial visualization (e.g., a seed visualization from a dashboard stored in a database) and efficiently generate a set of queries for selection and answer to a selected query for subsequent user interaction. An example application, according to some embodiments, is provided with reference to FIGS. 4-13. Details regarding the architecture of an example data analysis apparatus are provided with reference to FIGS. 1-2. Example processes for data processing and question retrieval are provided with reference to FIGS. 14-16.

System Architecture

An apparatus and method for data analysis are described. One or more aspects of the apparatus and method include at least one processor; at least one memory storing instructions executable by the at least one processor; a graph component configured to generate an analysis thread graph including a first node corresponding to a data visualization and an edge corresponding to an analysis path between the first node and a second node; and a data analysis interface configured to display the data visualization in a first region of the data analysis interface and an analysis thread visualization in a second region of the data analysis interface.

Some examples of the apparatus and method further include a query component configured to identify a dataset corresponding to the data visualization and to generate a plurality of queries based on the dataset.

Some examples of the apparatus and method further include an answer component configured to generate an answer to a query based on user input.

Some examples of the apparatus and method further include a navigation component configured to receive user input identifying the second node and to select an additional data visualization corresponding to the second node based on the user input.

Some examples of the apparatus and method further include a visualization component configured to transform the dataset to obtain a transformed dataset, and to generate the data visualization based on the transformed dataset.

FIG. 1 shows an example of a data analysis system according to aspects of the present disclosure. The example shown includes user 100, user device 105, data analysis apparatus 110, cloud 115, and database 120. Data analysis apparatus 110 is an example of, or includes aspects of, the corresponding element described with reference to FIG. 2.

As an example shown in FIG. 1, data analysis apparatus 110 receives a dataset from database 120 via e.g., cloud 115. The dataset contains a seed visualization (e.g., from a company dashboard). Data analysis apparatus 110 displays, via a data analysis interface, a data visualization in a first region of the data analysis interface. The data visualization includes a bar chat that depicts "Year" on x-axis and "Horsepower" on y-axis. In some examples, the data visualization is displayed in a first cell of a notebook environment (e.g., Python notebook).

Data analysis apparatus 110 displays, via the data analysis interface, an analysis thread visualization in a second region of the data analysis interface. The analysis thread visualization depicts an analysis thread graph including a first node (e.g., node "A") corresponding to the data visualization and an edge corresponding to an analysis path between the first node and a second node (node "B"). In some examples, the analysis thread graph is a tree including a set of nodes. If two or more nodes are located on a same level of the analysis thread graph and the two or more nodes share a same parent node, the two or more nodes may be referred to as sibling nodes.

In an embodiment, data analysis apparatus 110 is an interactive notebook framework configured to support low-code visual exploratory data analysis. Data analysis apparatus 110 generate next steps (e.g., a set of candidate queries) based on the underlying insights and data attributes in the current cell (e.g., visualization). User 100 selects a query from the set of candidate queries. The selected query states "which year has the lowest average horsepower?" Additionally, data analysis apparatus 110 displays, via the data analysis interface, an interactive analysis thread visualization that presents an overview and aid navigation among cells for different analysis threads.

User device 105 may be a personal computer, laptop computer, mainframe computer, palmtop computer, personal assistant, mobile device, or any other suitable processing apparatus. In some examples, user device 105 includes software that incorporates a data analysis and data exploration application (e.g., notebook environment). In some examples, the data analysis application on user device 105 may include functions of data analysis apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Data analysis apparatus 110 displays, via a data analysis interface, a data visualization in a first region of the data analysis interface; and displays, via the data analysis interface, an analysis thread visualization in a second region of the data analysis interface, wherein the analysis thread visualization depicts an analysis thread graph including a first node corresponding to the data visualization and an edge corresponding to an analysis path between the first node and a second node. The process of using data analysis apparatus 110 is further described with reference to FIG. 3.

Data analysis apparatus 110 includes a computer implemented network comprising a data analysis model that further includes graph component, data analysis interface, query component, answer component, navigation component, and visualization component. Data analysis apparatus 110 may also include a processor unit, a memory unit, an I/O module, and a training component. In some examples, the training component is used to train a machine learning model (or a data analysis model). Additionally, data analysis apparatus 110 can communicate with database 120 via cloud 115. Further detail regarding the architecture of data analysis apparatus 110 is provided with reference to FIG. 2. Further detail regarding the operation of data analysis apparatus 110 is provided with reference to FIGS. 3 and 14-16.

In some cases, data analysis apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
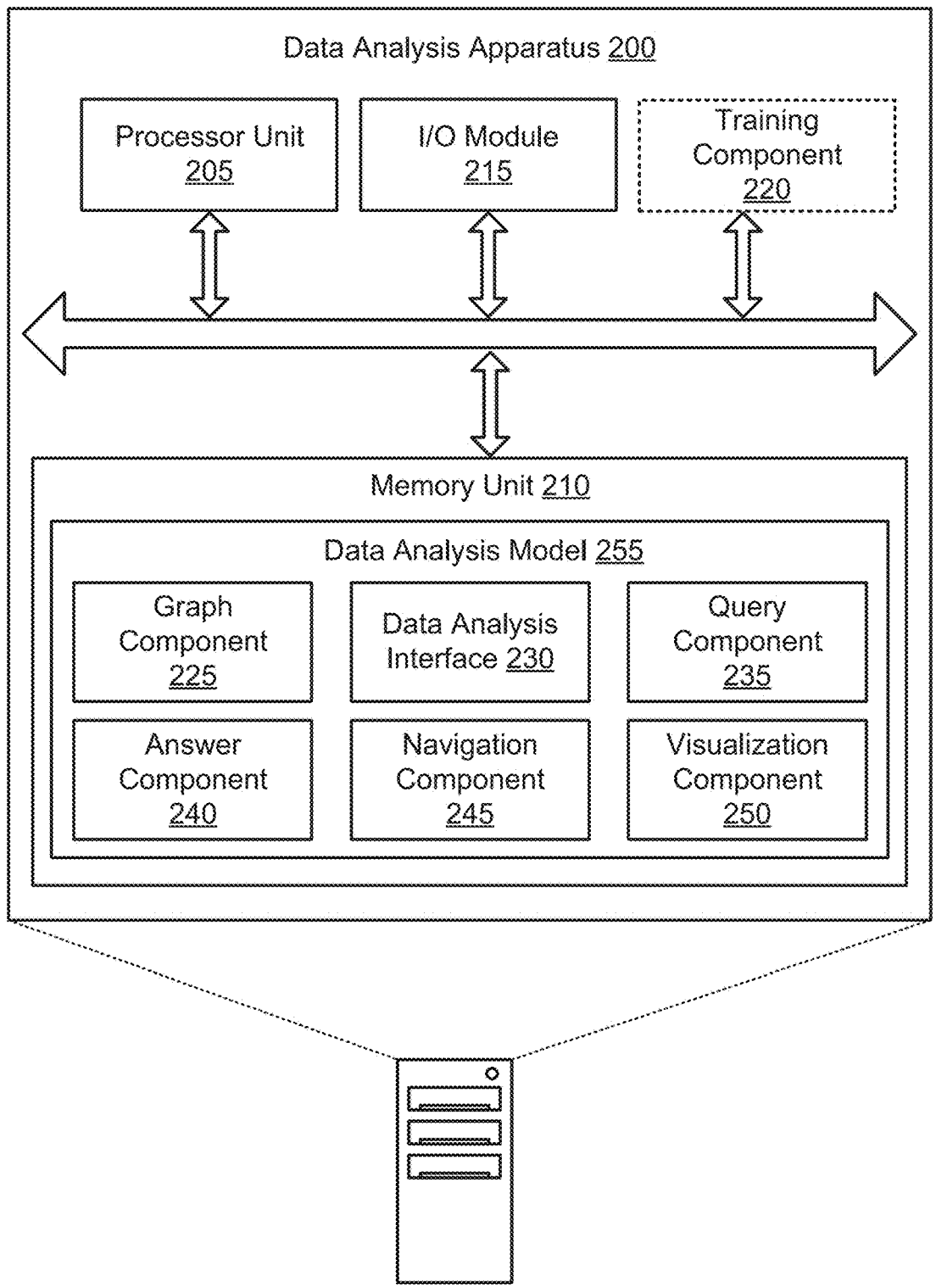
FIG. 2 shows an example of a data analysis apparatus according to aspects of the present disclosure.

FIG. 2 shows an example of a data analysis apparatus 200 according to aspects of the present disclosure. The example shown includes data analysis apparatus 200, processor unit 205, memory unit 210, I/O module 215, training component 220, and data analysis model 225. In one embodiment, data analysis model 225 includes graph component 230, data analysis interface 235, query component 240, answer component 245, navigation component 250, and visualization component 255. Data analysis apparatus 200 is an example of, or includes aspects of, the corresponding element described with reference to FIG. 1. In some embodiments, memory unit 210 stores instructions executable by processor unit 205.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments, data analysis model 225 applies machine learning and training component 220 is used to train data analysis model 225. In some examples, training component 220 is implemented on an apparatus other than data analysis apparatus 200.

According to some embodiments, graph component 230 adds a third node to the analysis thread graph based on the user input. Graph component 230 generates an analysis thread graph including a first node corresponding to a data visualization and an edge corresponding to an analysis path between the first node and a second node.

According to some embodiments, data analysis interface 235 displays a data visualization in a first region of data analysis interface 235. In some examples, data analysis interface 235 displays an analysis thread visualization in a second region of data analysis interface 235, where the analysis thread visualization depicts an analysis thread graph including a first node corresponding to the data visualization and an edge corresponding to an analysis path between the first node and a second node. In some examples, the analysis thread graph includes an additional edge corresponding to an additional analysis path between the first node and a third node, where the third node includes a sibling node of the second node.

In some examples, data analysis interface 235 displays a set of queries in a third region of data analysis interface 235. In some examples, data analysis interface 235 receives user input selecting the query corresponding to the second node. Data analysis interface 235 displays an additional data visualization corresponding to the second node based on the user input.

In some examples, data analysis interface 235 receives user input selecting a query from the set of queries. In some examples, data analysis interface 235 displays an additional data visualization corresponding to the second node based on the user input. Data analysis interface 235 is an example of, or includes aspects of, the corresponding element described with reference to FIGS. 4-10, and 12.

In some examples, the set of queries includes a query requesting additional data about an element of the data visualization. In some examples, the set of queries includes a query corresponding to the second node. In some examples, query component 240 identifies a dataset corresponding to the data visualization. In some examples, query component 240 generates the set of queries based on the dataset.

According to some embodiments, query component 240 is configured to identify a dataset corresponding to the data visualization and to generate a plurality of queries based on the dataset.

According to some embodiments, answer component 245 generates an answer to the query based on the user input.

According to some embodiments, navigation component 250 receives a user input indicating the second node of the analysis thread graph via the analysis thread visualization. In some examples, navigation component 250 receives user input identifying the second node and selects an additional data visualization corresponding to the second node based on the user input.

According to some embodiments, visualization component 255 generates an additional data visualization corresponding to the query. In some examples, visualization component 255 identifies a dataset corresponding to the data visualization. In some examples, visualization component 255 transforms the dataset based on the query, where the additional data visualization is based on the transformed dataset.

According to some embodiments, visualization component 255 is configured to transform the dataset to obtain a transformed dataset, and to generate the data visualization based on the transformed dataset.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Data Analysis Process

A method, apparatus, and non-transitory computer readable medium for data analysis are described. One or more embodiments of the method, apparatus, and non-transitory computer readable medium include displaying, via a data analysis interface, a data visualization in a first region of the data analysis interface and displaying, via the data analysis interface, an analysis thread visualization in a second region of the data analysis interface, wherein the analysis thread visualization depicts an analysis thread graph including a first node corresponding to the data visualization and an edge corresponding to an analysis path between the first node and a second node.

In some examples, the analysis thread graph comprises an additional edge corresponding to an additional analysis path between the first node and a third node, wherein the third node comprises a sibling node of the second node.

Some examples of the method, apparatus, and non-transitory computer readable medium further include displaying, via the data analysis interface, a plurality of queries in a third region of the data analysis interface.

In some examples, the plurality of queries includes a query requesting additional data about an element of the data visualization. In some examples, the plurality of queries includes a query corresponding to the second node.

Some examples of the method, apparatus, and non-transitory computer readable medium further include receiving user input selecting the query corresponding to the second node. Some examples further include displaying an additional data visualization corresponding to the second node based on the user input.

Some examples of the method, apparatus, and non-transitory computer readable medium further include receiving user input selecting a query from the plurality of queries. Some examples further include generating an additional data visualization corresponding to the query.

Some examples of the method, apparatus, and non-transitory computer readable medium further include identifying a dataset corresponding to the data visualization. Some examples further include transforming the dataset based on the query, wherein the additional data visualization is based on the transformed dataset.

Some examples of the method, apparatus, and non-transitory computer readable medium further include adding a third node to the analysis thread graph based on the user input.

Some examples of the method, apparatus, and non-transitory computer readable medium further include generating an answer to the query based on the user input.

Some examples of the method, apparatus, and non-transitory computer readable medium further include identifying a dataset corresponding to the data visualization. Some examples further include generating the plurality of queries based on the dataset.

Some examples of the method, apparatus, and non-transitory computer readable medium further include receiving a user input indicating the second node of the analysis thread graph via the analysis thread visualization. Some examples further include displaying an additional data visualization corresponding to the second node based on the user input.

A method, apparatus, and non-transitory computer readable medium for data analysis are described. One or more embodiments of the method, apparatus, and non-transitory computer readable medium include generating an analysis thread graph including a first node corresponding to a data visualization and an edge corresponding to an analysis path between the first node and a second node; displaying the data visualization in a first region of a data analysis interface; and displaying an analysis thread visualization in a second region of the data analysis interface.

Some examples of the method, apparatus, and non-transitory computer readable medium further include displaying a plurality of queries in a third region of the data analysis interface.

Some examples of the method, apparatus, and non-transitory computer readable medium further include receiving user input identifying the second node and to select an additional data visualization corresponding to the second node based on the user input.

Figure 3:
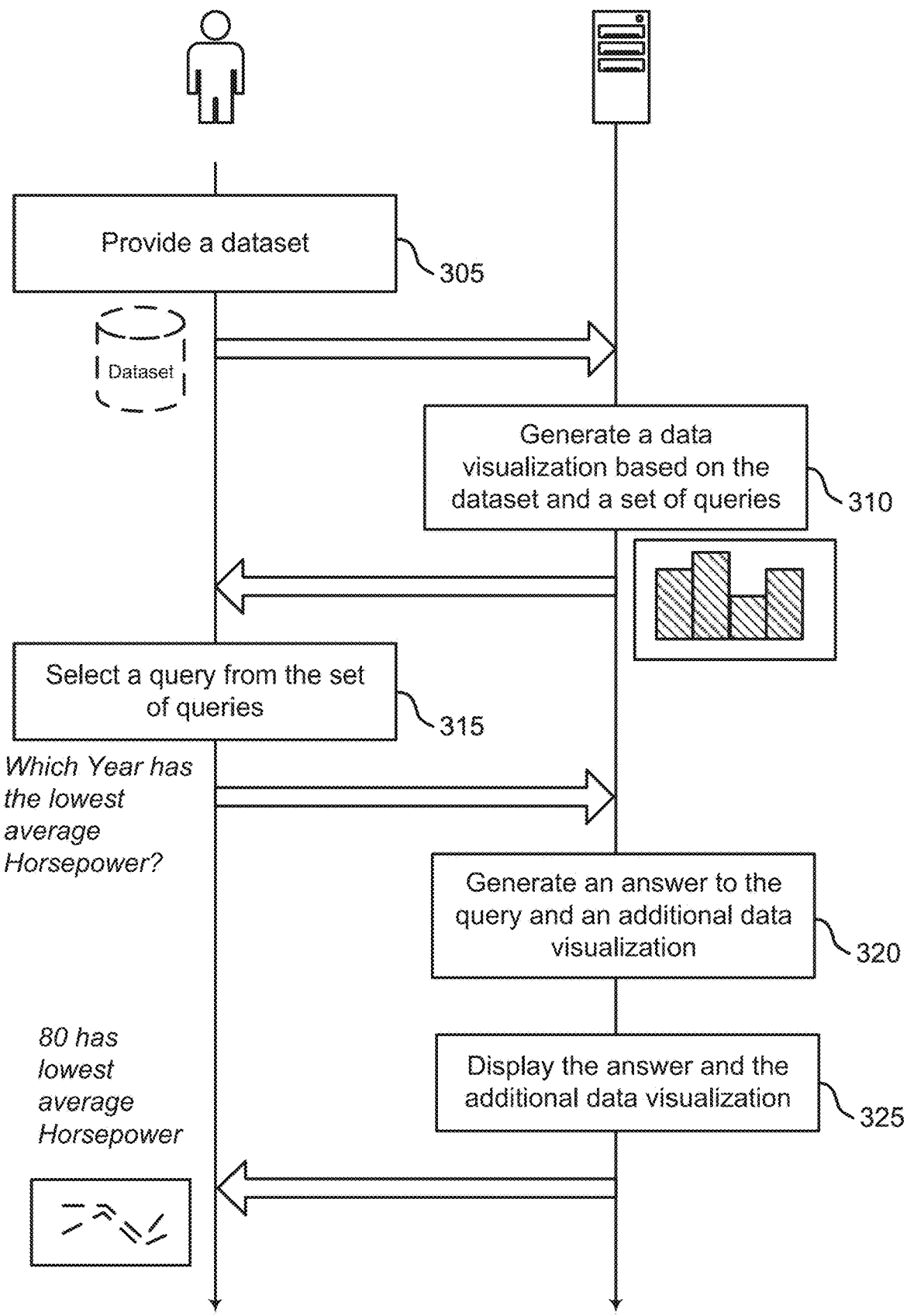
FIG. 3 shows an example of a method of a data analysis process according to aspects of the present disclosure.

FIG. 3 shows an example of a data analysis process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 305, the user provides a dataset. In some cases, the operations of this step refer to, or may be performed by, a user as described with reference to FIG. 1.

In some cases, the user provides a dataset for analysis by uploading the dataset to the data analysis apparatus. The dataset is in a variety of file formats, such as a CSV file, a spreadsheet, or a data raw file. The dataset contains one or more tables of data, with each table containing a set of rows and columns of data points. For example, a dataset may contain sales data for a company over several years, with each row representing a single sale and each column representing a different attribute such as the date of the sale, the car model sold, and the price. For example, the user may provide the dataset by uploading it to the data analysis interface or by retrieving the dataset from a remote dataset.

At operation 310, the system generates a data visualization based on the dataset and a set of queries. In some cases, the operations of this step refer to, or may be performed by, a data analysis apparatus as described with reference to FIGS. 1 and 2.

In some cases, the data visualization takes the form of a chart, a graph, or other types of visual representation. For example, if the dataset includes a collection of sales data, the data visualization may be a bar chart showing the sale information for each month. The set of queries are generated based on the data visualization. For example, if the data visualization is a scatter plot showing the relationship between two variables, the data analysis apparatus generates a set of queries that include questions about insights related to the two variables, e.g., the strength of the relationship, reason behind the relationship.

At operation 315, the user selects a query from the set of queries. In some cases, the operations of this step refer to, or may be performed by, a user as described with reference to FIG. 1.

In some cases, the set of queries are displayed in a specified region of the data analysis interface, and the user selects a query by clicking on a query for further exploration. For example, the set of queries may include questions about the relationship between different attributes in the dataset, such as "Which Year has the lowest average Horsepower?" The user selects the query by clicking on it.

At operation 320, the system generates an answer to the query and an additional data visualization. In some cases, the operations of this step refer to, or may be performed by, a data analysis apparatus as described with reference to FIGS. 1 and 2.

For example, the data analysis apparatus analyzes the dataset to determine which year has the lowest average horsepower and generates a text answer "80 has the lowest average Horsepower" along with a data visualization such as a bar chart showing the average horsepower over years.

At operation 325, the system displays the answer to the query and the additional data visualization. In some cases, the operations of this step refer to, or may be performed by, a data analysis apparatus as described with reference to FIGS. 1 and 2.

For example, the user reviews the answer and visualization to gain insights into the dataset. Interactive elements of the data analysis interface enables the user to explore further, such as filtering the data by different attributes or zooming in on specific areas of the data visualization.

FIG. 4 shows an example of a data analysis interface 400 according to aspects of the present disclosure. The example shown includes data analysis interface 400, first region 405, second region 410, third region 415, data visualization 420, queries 425, analysis thread visualization 430, first node 435, second node 440, answer 445, additional data visualization 450, and additional queries 455. Data analysis interface 400 is an example of, or includes aspects of, the corresponding element described with reference to FIGS. 2, 5-10, and 12.

In an embodiment, the data analysis apparatus enables users to perform exploratory data analysis on an unfamiliar dataset efficiently. In an example, a user (e.g., sales manager at a car company), encounters a dot plot showing the Horsepower of cars for different Years based on a dataset. The dataset stores the details of purchased cars when browsing the company's visualization dashboard. The user is interested in learning more about the car statistics. In some examples, the user extracts the Vega-Lite chart from the dashboard and adds it as the first cell in the data analysis interface 400 (e.g., a notebook-based environment). Data visualization 420 showing the dot plot (Horsepower vs. Year) is displayed on first region 405 of data analysis interface 400.

By clicking on the right caret icon on the upper-left corner of the newly added cell, the user sees queries 425 related to the Horsepower showing up in an additional panel below the data visualization 420. The user selects the third question from queries 425, "Which year has the lowest average Horsepower?", to begin a data exploration process. In response, the data analysis model renders a new cell containing a new bar chart visualization showing the average Horsepower versus the Year, whose title is the clicked question and subtitle is the answer 445 (i.e., the corresponding data insight). The new bar chart visualization is referred to as additional data visualization 450. Additional data visualization 450 indicates that the lowest average value occurred at 1980. The data analysis model generates visualization-powered insight and the user can identify this new insight without writing codes. Accordingly, the user focuses on exploring the dataset.

According to some embodiments, to continue data exploration and analysis, the user opens the question panel of the new cell, skims additional queries 455. Additional queries 455 are displayed in third region 415 of data analysis interface 400. The user clicks on a question from additional queries 455, "What might explain the fact that 1980 has the lowest average Horsepower?" Detail regarding subsequent data exploration is described in FIGS. 5 and 6.

First region 405 is an example of, or includes aspects of, the corresponding element described with reference to FIGS. 5-7. Second region 410 is an example of, or includes aspects of, the corresponding element described with reference to FIGS. 5-7. Third region 415 is an example of, or includes aspects of, the corresponding element described with reference to FIGS. 5-7. Data visualization 420 is an example of, or includes aspects of, the corresponding element described with reference to FIG. 7. Queries 425 is an example of, or includes aspects of, the corresponding element described with reference to FIG. 7.

Analysis thread visualization 430 is located in second region 410. Analysis thread visualization 430 includes first node 435. First node 435 corresponds to the data visualization 420. Analysis thread visualization 430 is an example of, or includes aspects of, the corresponding element described with reference to FIGS. 5 and 6. First node 435 is an example of, or includes aspects of, the corresponding element described with reference to FIGS. 5 and 6. Second node 440 is an example of, or includes aspects of, the corresponding element described with reference to FIGS. 5 and 6. Answer 445 is an example of, or includes aspects of, the corresponding element described with reference to FIGS. 5, 6, 8, 11, and 13.

Additional data visualization 450 is an example of, or includes aspects of, the corresponding element described with reference to FIGS. 5, 6, 8-10, and 12. Additional queries 455 is an example of, or includes aspects of, the corresponding element described with reference to FIGS. 5, 6, 8, 10, and 12.

FIG. 5 shows an example of a data analysis interface 500 according to aspects of the present disclosure. The example shown includes data analysis interface 500, first region 505, second region 510, third region 515, additional data visualization 520, answers 525, answer 530, analysis thread visualization 535, first node 540, second node 545, third node 550, fourth node 555, and fifth node 560. Data analysis interface 500 is an example of, or includes aspects of, the corresponding element described with reference to FIGS. 2, 4, 6-10, and 12.

According to some embodiments, to continue data exploration and analysis, the user opens the question panel of the new cell, skims the new set of questions. The set of questions are displayed in third region 515 of data analysis interface 500. The user clicks on a question from the new set of questions, "What might explain the fact that 1980 has the lowest average Horsepower?"

The data analysis model inserts a new cell whose title is the selected question. The data analysis model provides one or more answers 525 (i.e., possible analysis directions). An analysis direction indicates the extreme average value of another attribute as well as the correlation between Horsepower and the new attribute, which encourages the user to dive deeper into the analysis of the Horsepower, but also to consider the impact of other attributes in the dataset. The first and second answer of answers 525 involves Weight and Acceleration, respectively. The user finds the first and second answers are more relevant than the latter two answers. Thus, the user clicks on them to see their corresponding visualizations (i.e., additional data visualization 520). The new cells produce a figure with two sub-plots, illustrating the correlation between the two attributes and displaying the extreme average value of the new attribute over Year. Looking into the two new cells (i.e., additional data visualization 520), the user gains better understanding of the combinations of these attributes and their distributions over time. The user continues his analysis by iteratively exploring the recommended follow-up questions suggested by the data analysis model for the two new attributes. Detail regarding subsequent data exploration is described in FIG. 6.

First region 505 is an example of, or includes aspects of, the corresponding element described with reference to FIGS. 4, 6, and 7. Second region 510 is an example of, or includes aspects of, the corresponding element described with reference to FIGS. 4, 6, and 7. Third region 515 is an example of, or includes aspects of, the corresponding element described with reference to FIGS. 4, 6, and 7.

Additional data visualization 520 is an example of, or includes aspects of, the corresponding element described with reference to FIGS. 4, 6, 8-10, and 12. Answer 530 is an example of, or includes aspects of, the corresponding element described with reference to FIGS. 4, 6, 8, 11, and 13.

Analysis thread visualization 535 is an example of, or includes aspects of, the corresponding element described with reference to FIGS. 4 and 6. First node 540 is an example of, or includes aspects of, the corresponding element described with reference to FIGS. 4 and 6. Second node 545 is an example of, or includes aspects of, the corresponding element described with reference to FIGS. 4 and 6. Third node 550 is an example of, or includes aspects of, the corresponding element described with reference to FIG. 6. Fourth node 555 is an example of, or includes aspects of, the corresponding element described with reference to FIG. 6. Fifth node 560 is an example of, or includes aspects of, the corresponding element described with reference to FIG. 6.

Figure 6:
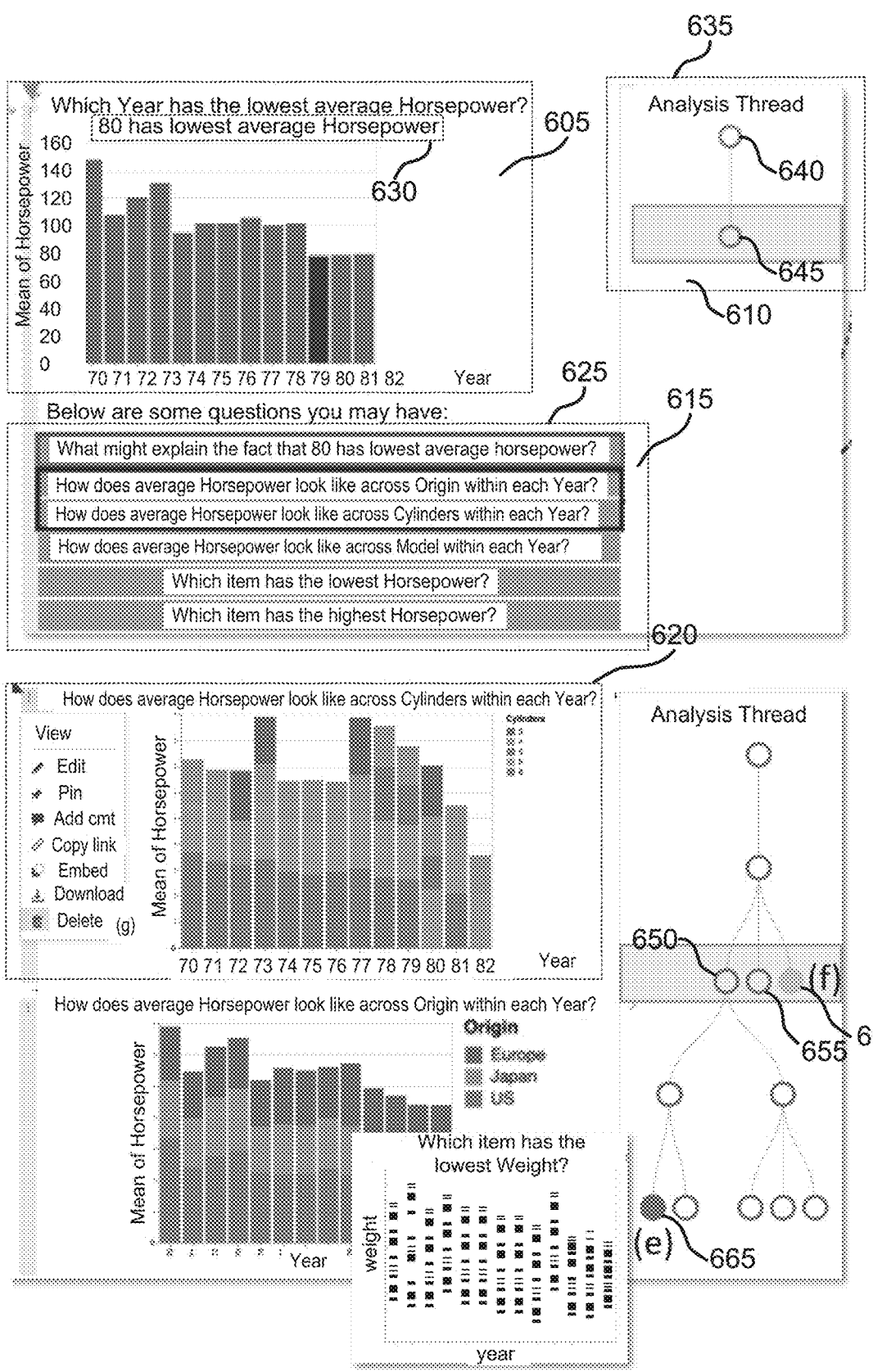

FIG. 6 shows an example of a data analysis interface 600 according to aspects of the present disclosure. The example shown includes data analysis interface 600, first region 605, second region 610, third region 615, additional data visualization 620, additional queries 625, answer 630, analysis thread visualization 635, first node 640, second node 645, third node 650, fourth node 655, fifth node 660, and sixth node 665. Data analysis interface 600 is an example of, or includes aspects of, the corresponding element described with reference to FIGS. 2, 4, 5, 7-10, and 12.

According to an embodiment, analysis thread visualization 635 includes an analysis thread graph. The analysis thread graph is located in second region 610 of data analysis interface 600. In the analysis thread graph, first node 640 is a parent node of second node 645. First node 640 corresponds to the initial data visualization populated or generated from a dataset. Second node 645 corresponds the data visualization located in first region 605 of data analysis interface 600, e.g., the bar plot showing "which Year has the lowest average Horsepower".

According to some embodiments, the user has explored a few visualizations related to Weight and Acceleration at this point. While the user learns about the two attributes, the user wants to get back to his original goal of understanding the Horsepower. The notebook may be long due to the number of cells generated during data exploration and the user wants to figure out where he left off in the analysis. Analysis thread visualization 635 is placed on the right-hand side of data analysis interface 600. Analysis thread visualization 635 is used to easily locate a relevant cell in the notebook.

As an example shown in FIG. 6, two branches corresponding to diverging exploration on the Weight and Acceleration are presented. By hovering over third node 650 and fourth node 655, a small version of the corresponding visualization appears or pops up as a tooltip. The user hovers over a node of interest to receive information related to the initial analysis trajectory, e.g., locate the initial or previous data visualization about the average Horsepower. By clicking on a node, the user can jump to the correct place in the notebook (trace back to a cell from data exploration), with the question panel open and ready for further analysis. The user can now pick up his earlier analysis about the average Horsepower where he previously left off. For example, the user is interested in the second question and the third question, "How does average Horsepower look like across Origin within each Year?" and "How does average Horsepower look like across Cylinders within each Year?" Additional queries 625 are located or displayed in third region 615 of data analysis interface 600.

Selecting these questions to insert new cells into the notebook containing stacked bar charts where the color encodes the new data attribute (Origin or Cylinders). The data analysis model updates analysis thread visualization 635 to show the newly diverging analysis trajectories. The user finds that the additional data visualization conveys a meaningful insight that cars from the US tend to have larger Horsepower compared to cars from Japan and Europe. For example, additional data visualization 620 shows a bar plot having attribute Year on the x-axis and Mean of Horsepower on the y-axis.

In some examples, the user finds that the visualization about the Cylinders is not informative and wants to get rid of it. The user can delete this cell by clicking on the three-dot icon to the right of the right caret icon and selecting the "delete" option from the drop-down list. The corresponding node in analysis thread visualization 635 is temporarily greyed out (e.g., fifth node 660). Fifth node 660 may not be deleted and accordingly, the user still has access to this archived exploration step. At this point, the user is satisfied with his analysis starting from the initial Horsepower visualization. In some cases, the user switches back to the visualization dashboard of the company and searches for other datasets or charts. The user runs additional data exploration using the data analysis model via data analysis interface 600.

In an embodiment, hovering on a node (e.g., sixth node 665) generates a thumbnail image or a tooltip that corresponds to a data visualization from a previous cell. The user clicks on sixth node 665 and can track back to the cell that contains answer to "which item has the lowest weight" and the relevant data visualization.

First region 605 is an example of, or includes aspects of, the corresponding element described with reference to FIGS. 4, 5, and 7. Second region 610 is an example of, or includes aspects of, the corresponding element described with reference to FIGS. 4, 5, and 7. Third region 615 is an example of, or includes aspects of, the corresponding element described with reference to FIGS. 4, 5, and 7.

Additional data visualization 620 is an example of, or includes aspects of, the corresponding element described with reference to FIGS. 4, 5, 8-10, and 12. Additional queries 625 is an example of, or includes aspects of, the corresponding element described with reference to FIGS. 4, 5, 8, 10, and 12. Answer 630 is an example of, or includes aspects of, the corresponding element described with reference to FIGS. 4, 5, 8, 11, and 13.

Analysis thread visualization 635 is an example of, or includes aspects of, the corresponding element described with reference to FIGS. 4 and 5. First node 640 is an example of, or includes aspects of, the corresponding element described with reference to FIGS. 4 and 5. Second node 645 is an example of, or includes aspects of, the corresponding element described with reference to FIGS. 4 and 5. Third node 650 is an example of, or includes aspects of, the corresponding element described with reference to FIG. 5. Fourth node 655 is an example of, or includes aspects of, the corresponding element described with reference to FIG. 5. Fifth node 660 is an example of, or includes aspects of, the corresponding element described with reference to FIG. 5.

Figure 7:
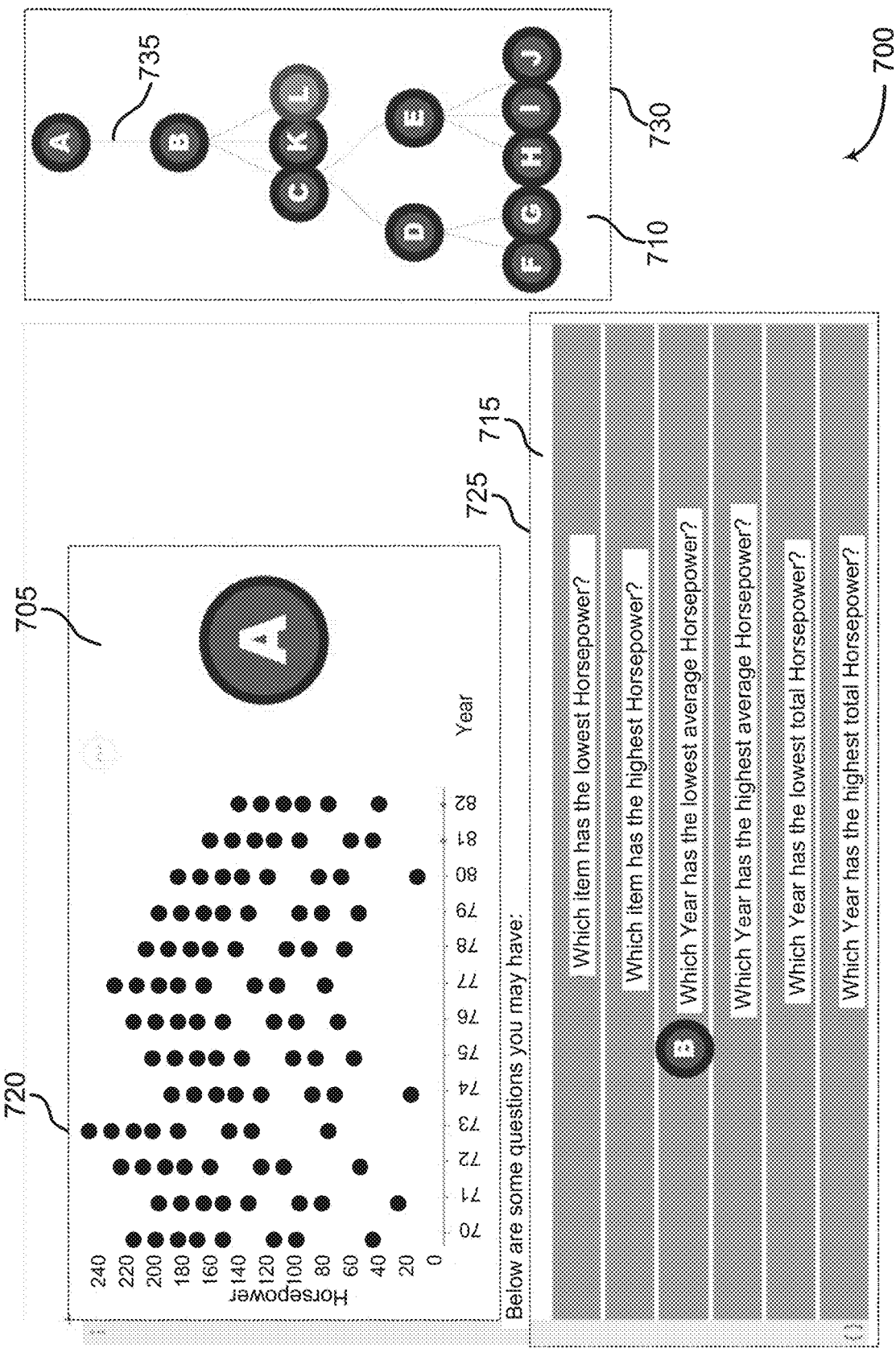

FIG. 7 shows an example of a data analysis interface 700 according to aspects of the present disclosure. The example shown includes data analysis interface 700, first region 705, second region 710, third region 715, data visualization 720, queries 725, analysis thread graph 730, and edge 735. Data analysis interface 700 is an example of, or includes aspects of, the corresponding element described with reference to FIGS. 2, 4-6, 8-10, and 12.

According to some embodiments, the data analysis model is configured to implement a low-code notebook model. The notebook cells of data analysis interface 700 can present recommendations for new steps in the analysis process in the form of follow-up questions or actions.

In some cases, a notebook cell includes an executed result (e.g., the scatter plot visualization) and a code editor containing the corresponding code snippet. The code editor and code snippet are optional. Data analysis interface 700 includes an interaction panel (e.g., queries 725 displayed in third region 715). Queries 725 are automatically generated and augment the interactivity of the cells to enable data exploration in a low-code manner. Without seeing the code, the user clicks on queries 725 displayed in third region 715. The data analysis model is configured to render one or more new notebook cells based on the user input.

The data analysis model, via data analysis interface 700, enables users to navigate through data exploration history (e.g., cells generated). For example, a user can go back to a notebook cell and recall how a notebook cell was generated during the exploratory data analysis process (i.e., at what step during the data analysis process did this visualization get added). The data analysis model incorporates analysis thread visualization in the form of analysis thread graph 730. Analysis thread graph 730 is used to increase awareness of the current data exploration process and enable quick localization of cells. Analysis thread graph 730 is of a tree structure. The synchronization details between the notebook cells and the analysis thread visualization are described below.

In an embodiment, the analysis thread visualization is updated in real-time to reflect the structure of the EDA process, i.e., the relationship among notebook cells. When a new cell is added by clicking a recommended question from the interaction panel of a certain cell. In some examples, the selected question is from queries 725 displayed in third region 715 of data analysis interface 700. The data analysis model appends a new node below its parent node in the analysis thread visualization. The new node corresponds to the new cell and edge 735 corresponds to an analysis path between node "A" and node "B" indicating its parent-child relationship in analysis thread graph 730. Node "B" is appended below node "A" in analysis thread graph 730. As more and more cells emerge along the data exploration process, users can still capture the overall structure of their analysis by referencing nodes in analysis thread graph 730.

In some examples, the user clicks on a question from queries 725 displayed in the interaction panel of the current cell (i.e., third region 715 of data analysis interface 700). The data analysis model renders a new notebook cell containing the selected question and data insight, and a visualization showing the answer insight. Detail regarding outcome from interacting with node "B" (e.g., select the question "which Year has the lowest average Horsepower?") will be described in FIG. 8.

First region 705 is an example of, or includes aspects of, the corresponding element described with reference to FIGS. 4-6. Second region 710 is an example of, or includes aspects of, the corresponding element described with reference to FIGS. 4-6. Third region 715 is an example of, or includes aspects of, the corresponding element described with reference to FIGS. 4-6.

Data visualization 720 is an example of, or includes aspects of, the corresponding element described with reference to FIG. 4. Queries 725 is an example of, or includes aspects of, the corresponding element described with reference to FIG. 4.

Figure 8:
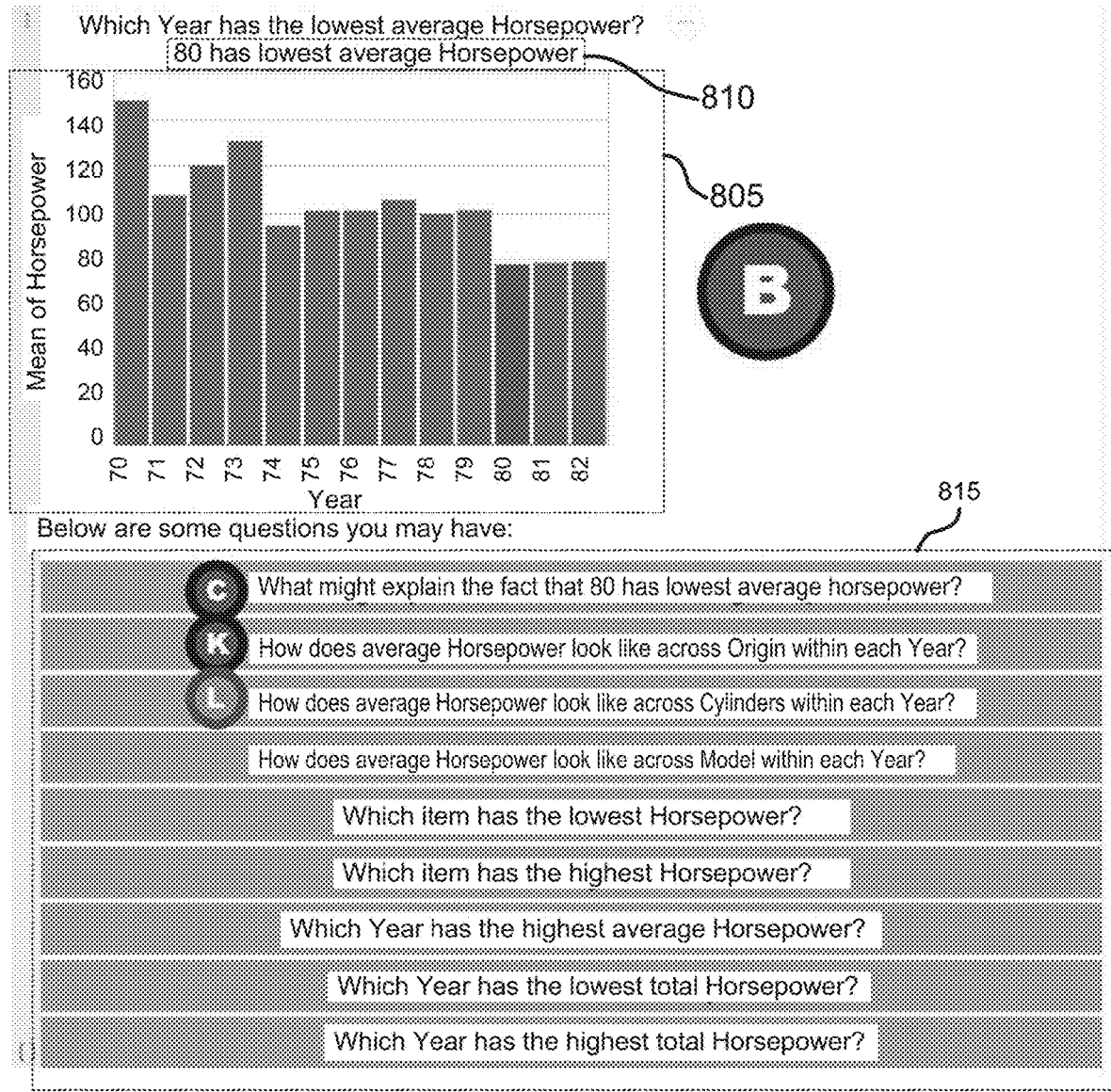

FIG. 8 shows an example of a data analysis interface 800 according to aspects of the present disclosure. The example shown includes data analysis interface 800, additional data visualization 805, answer 810, and additional queries 815. Data analysis interface 800 is an example of, or includes aspects of, the corresponding element described with reference to FIGS. 2, 4-7, 9, 10, and 12.

The data analysis model presents answer 810 to the selected question "Which Year has the lowest average Horsepower". Answer 810 is "80 has lowest average Horsepower". This new notebook cell contains an interaction panel where the data analysis model further presents additional queries 815 based on content of the new cell. In cases where a question is asked that has multiple options for understanding the answer, the data analysis model, via data analysis interface 800, presents the combined text of each set of these insights in the interaction panel as a possible action for the user.

Additional data visualization 805 is an example of, or includes aspects of, the corresponding element described with reference to FIGS. 4-6, 9, 10, and 12. Answer 810 is an example of, or includes aspects of, the corresponding element described with reference to FIGS. 4-6, 11, and 13. Additional queries 815 is an example of, or includes aspects of, the corresponding element described with reference to FIGS. 4-6, 10, and 12.

Figure 9:
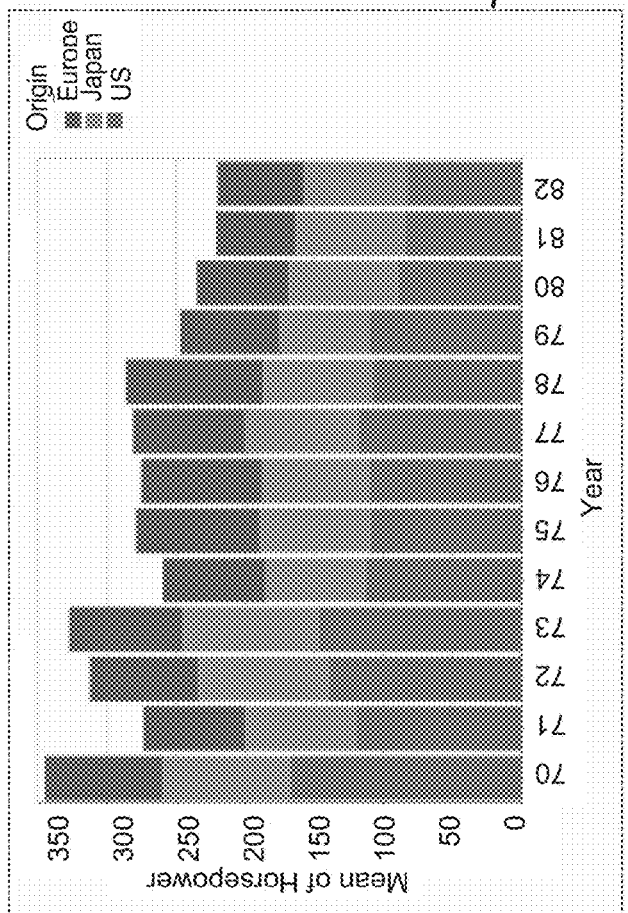

FIG. 9 shows an example of a data analysis interface 900 according to aspects of the present disclosure. The example shown includes data analysis interface 900, additional data visualization 905, selected query 910, and answers 915.

In some examples, a user selects "How does average Horsepower look like across Origin within each Year?" from additional queries 815 (shown in FIG. 8). Data analysis interface 900 presents additional data visualization 905, which is a bar chart. The bar chart displays attribute "Year" on the x-axis and "Mean of Horsepower" on the y-axis. Additional data visualization 905 corresponds to node "K" in analysis thread graph 730 (shown in FIG. 7).

In some examples, selected query 910 is "What might explain the fact that 80 has lowest average Horsepower?" from additional queries 815 (shown in FIG. 8). Data analysis interface 900 presents answers 915 (e.g., four statements that provide explanations in response to selected query 910). The combination of selected query 910 and answers 915 corresponds to node "C" in analysis thread graph 730.

A first answer from answers 915 says "Horsepower and Weight have strong correlation, and 80 has lowest average Weight". The first answer corresponds to node "D" in analysis thread graph 730 (shown in FIG. 7). A second answer from answers 915 says "Acceleration and Horsepower have a moderate inverse correlation, and 80 has highest Acceleration". The second answer corresponds to node "E" in analysis thread graph 730 (shown in FIG. 7).

Data analysis interface 900 is an example of, or includes aspects of, the corresponding element described with reference to FIGS. 2, 4-8, 10, and 12. Additional data visualization 905 is an example of, or includes aspects of, the corresponding element described with reference to FIGS. 4-6, 8, 10, and 12. Selected query 910 is an example of, or includes aspects of, the corresponding element described with reference to FIGS. 11 and 13.

Figure 10:
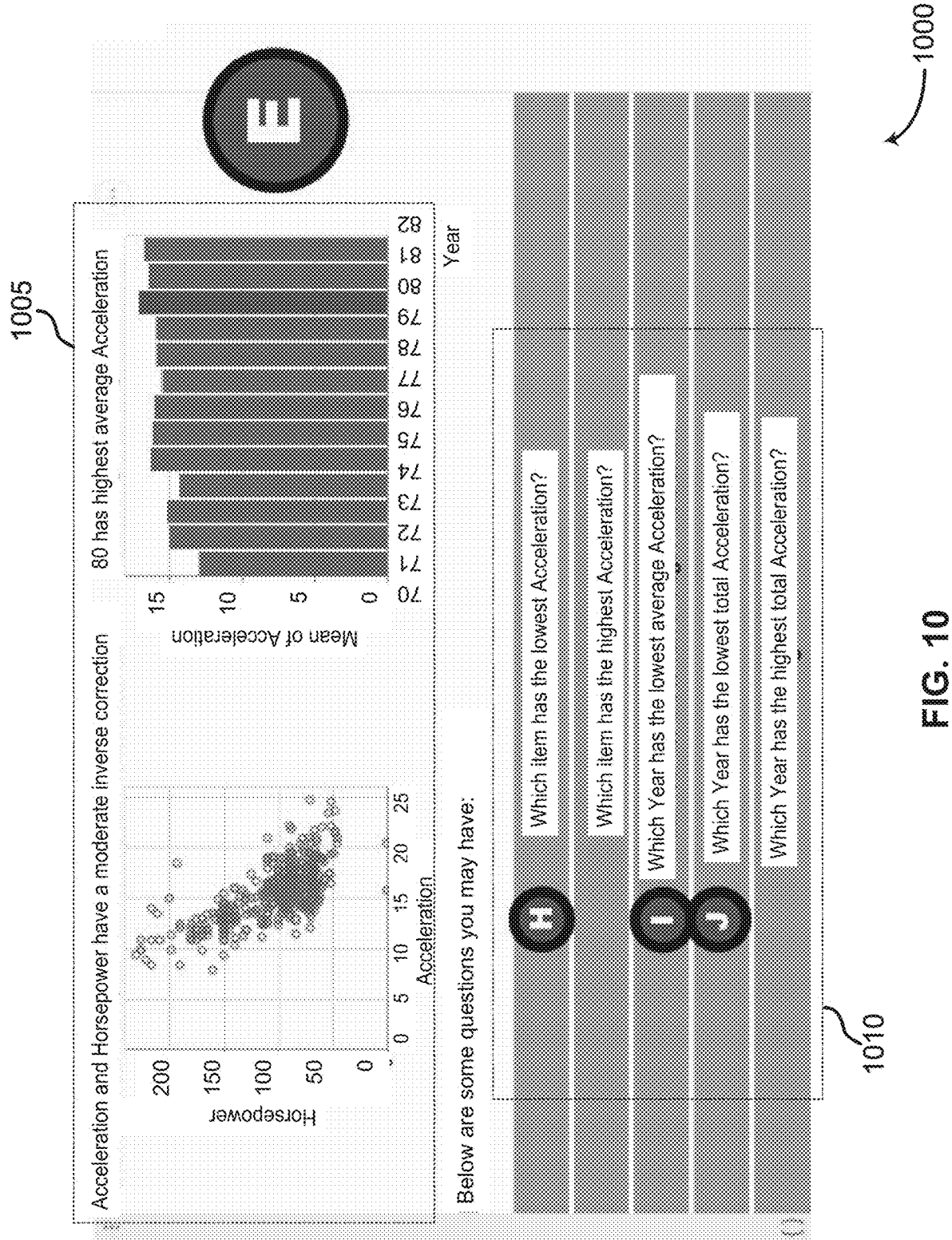

FIG. 10 shows an example of a data analysis interface 1000 according to aspects of the present disclosure. The example shown includes data analysis interface 1000, additional data visualization 1005, and additional queries 1010.

In some examples, a user is interested in receiving more information about "Acceleration and Horsepower have a moderate inverse correlation, and 80 has highest Acceleration" from answers 915 (shown in FIG. 9). The user selects this answer and data analysis interface 1000 then presents additional data visualization 1005. Additional data visualization 1005 includes a plot graph on the left and a bar chart on the right. Text "Acceleration and Horsepower have a moderate inverse correlation" is displayed next to the plot graph on the left. Text "80 has highest Acceleration" is displayed next to the bar chart on the right. Additional data visualization 1005 corresponds to node "E" in analysis thread graph 730 (shown in FIG. 7).

In an embodiment, the data analysis model generates additional queries 1010 based on the selected answer, i.e., "Acceleration and Horsepower have a moderate inverse correlation, and 80 has highest Acceleration". For example, additional queries 1010 include five questions for the use to select. A first question is "which item has the lowest Acceleration?". A second question is "which Year has the lowest average Acceleration?". A third question is "which Year has the lowest total acceleration?".

Data analysis interface 1000 is an example of, or includes aspects of, the corresponding element described with reference to FIGS. 2, 4-9, and 12. Additional data visualization 1005 is an example of, or includes aspects of, the corresponding element described with reference to FIGS. 4-6, 8, 9, and 12. Additional queries 1010 is an example of, or includes aspects of, the corresponding element described with reference to FIGS. 4-6, 8, and 12.

Figure 11:
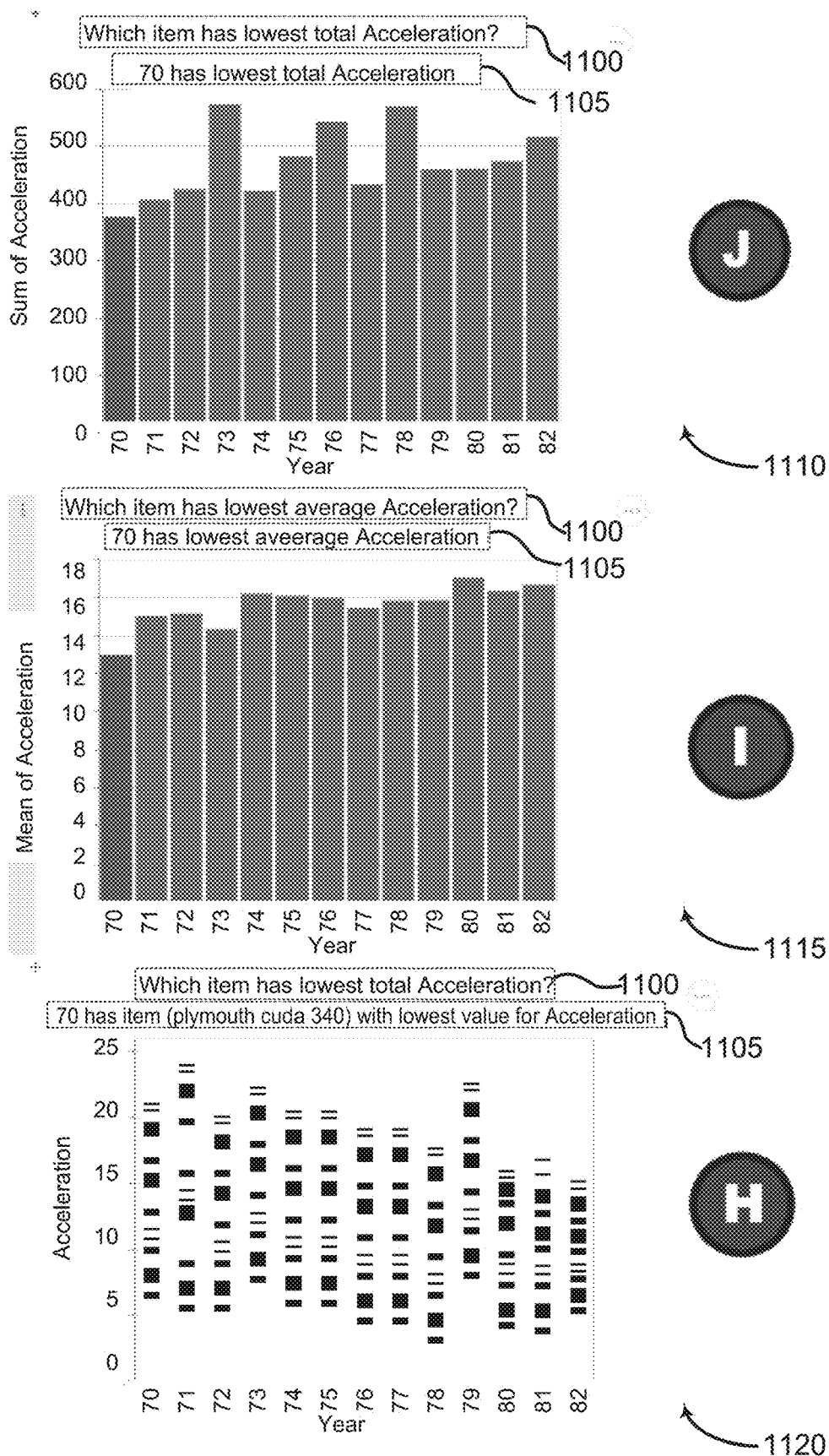
FIG. 11 shows an example of a data analysis interface according to aspects of the present disclosure.

FIG. 11 shows an example of a data analysis interface according to aspects of the present disclosure. The example shown includes selected query 1100, answer 1105, first data visualization 1110, second data visualization 1115, and third data visualization 1120.

In some examples, selected query 1100 states "which item has lowest total acceleration" that is selected at a prior step. Data analysis model 255 (as described in FIG. 2) generates answer 1105 in response to selected query 1100. Answer 1105 states "70 has lowest total acceleration". Selected query 1100 is an example of, or includes aspects of, the corresponding element described with reference to FIGS. 9 and 13. Answer 1105 is an example of, or includes aspects of, the corresponding element described with reference to FIGS. 4-6, 8, and 13.

For example, first data visualization 1110 corresponds to a node (e.g., node "J") of an analysis thread graph in the analysis thread visualization. First data visualization 1110 is an example of, or includes aspects of, the corresponding element described with reference to FIG. 13.

Second data visualization 1115 corresponds to a node (e.g., node "I") of an analysis thread graph in the analysis thread visualization. Second data visualization 1115 is an example of, or includes aspects of, the corresponding element described with reference to FIG. 13.

Third data visualization 1120 corresponds to a node (e.g., node "H") of an analysis thread graph in the analysis thread visualization. Node "J", "I", and "H" are also depicted in FIG. 10 next to a corresponding question from additional queries 1010.

Figure 12:
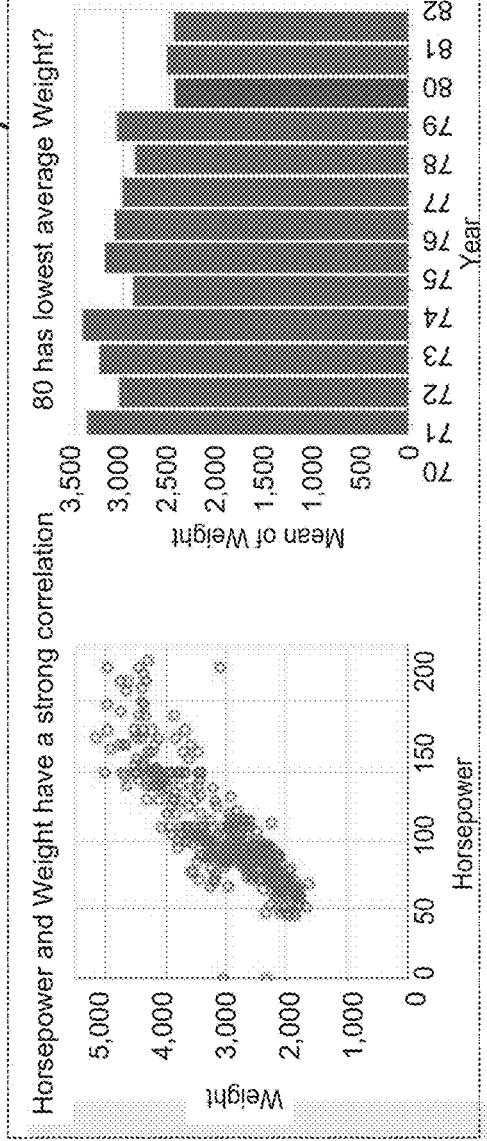
FIG. 12 shows an example of a data analysis interface according to aspects of the present disclosure.

FIG. 12 shows an example of a data analysis interface 1200 according to aspects of the present disclosure. The example shown includes data analysis interface 1200, additional data visualization 1205, and additional queries 1210.

In an example shown in FIG. 12, additional data visualization 1205 includes a plot chart (top left) and a bar chart (top right). The plot chart is data visualization depicting "horsepower and weight have a strong correlation". The bar chart is data visualization depicting "80 has lowest average weight". Additional data visualization 1205 corresponds to a node (e.g., node "D") of an analysis thread graph in the analysis thread visualization. Additional queries 1210 includes a set of five questions. A first question of additional queries 1210 states "which item has the lowest weight". The first question corresponds to a node (e.g., node "F") of an analysis thread graph in the analysis thread visualization. A second question of additional queries 1210 states "which item has the highest weight". The second question corresponds to a node (e.g., node "G") of the analysis thread graph in the analysis thread visualization.

Data analysis interface 1200 is an example of, or includes aspects of, the corresponding element described with reference to FIGS. 2, and 4-10. Additional data visualization 1205 is an example of, or includes aspects of, the corresponding element described with reference to FIGS. 4-6, and 8-10. Additional queries 1210 is an example of, or includes aspects of, the corresponding element described with reference to FIGS. 4-6, 8, and 10.

Figure 13:
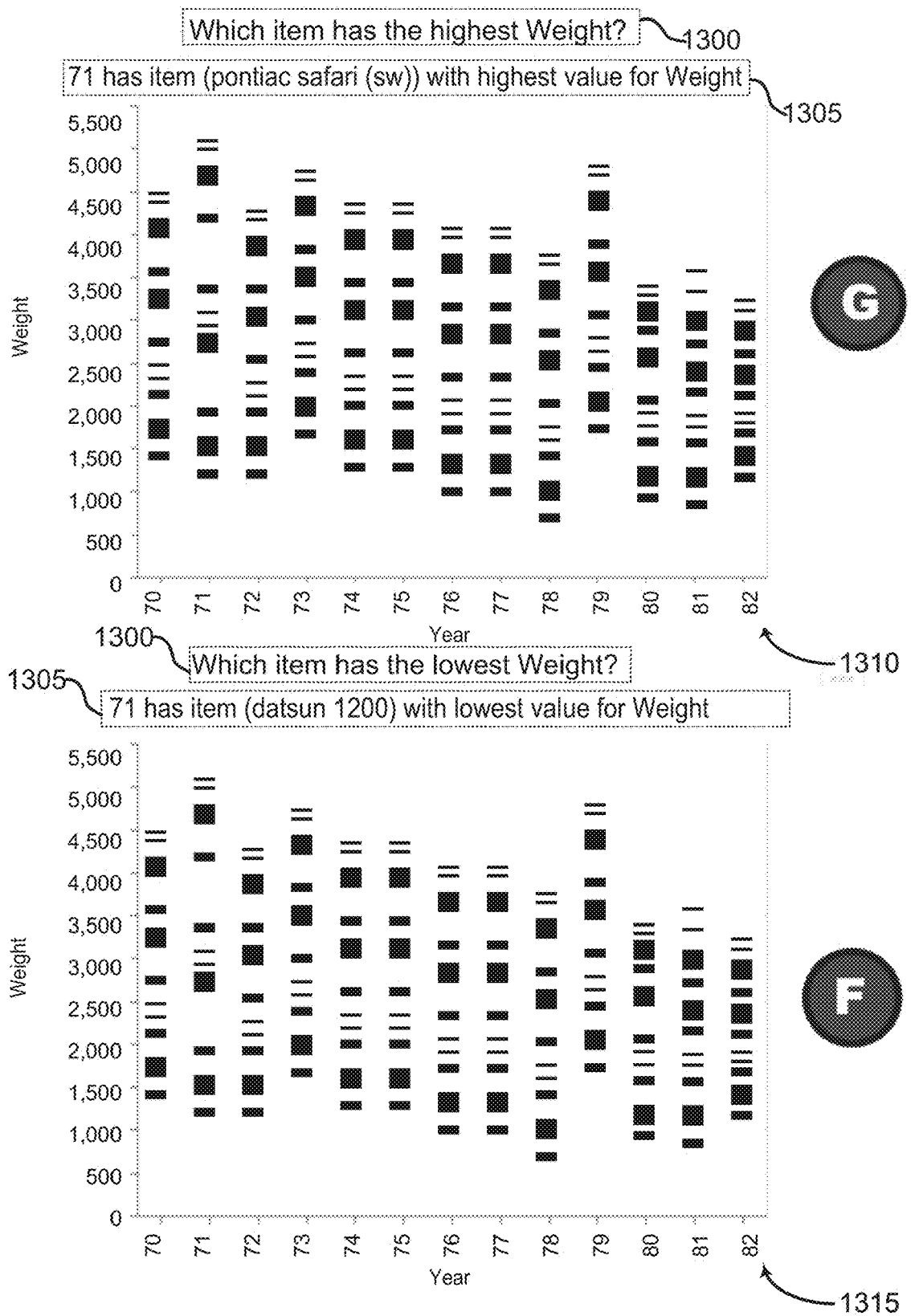
FIG. 13 shows an example of a data analysis interface according to aspects of the present disclosure.

FIG. 13 shows an example of a data analysis interface according to aspects of the present disclosure. The example shown includes selected query 1300, answer 1305, first data visualization 1310, and second data visualization 1315.

In an example shown in FIG. 13, at the top, selected query 1300 is "which item has the highest weight". Answer 1305 to selected query 1300 is "71 has item (pontiac safari (sw)) with highest value for weight". First data visualization 1310 displays a data visualization depicting a year-weight graph. X-axis of the graph is year and y-axis of the graph is weight. First data visualization 1310 corresponds to a node (e.g., node "G") of an analysis thread graph in the analysis thread visualization. Second data visualization 1315 corresponds to a node (e.g., node "F") of the analysis thread graph in the analysis thread visualization.

Selected query 1300 is an example of, or includes aspects of, the corresponding element described with reference to FIGS. 9 and 11. Answer 1305 is an example of, or includes aspects of, the corresponding element described with reference to FIGS. 4-6, 8, and 11. First data visualization 1310 is an example of, or includes aspects of, the corresponding element described with reference to FIG. 11.

In an example shown in FIG. 13, at the bottom, selected query 1300 is "which item has the lowest weight". Answer 1305 to selected query 1300 is "71 has item (datsun 1200) with lowest value for weight". Second data visualization 1315 displays a data visualization depicting a year-weight graph. X-axis of the graph is year and y-axis of the graph is weight. Second data visualization 1315 is an example of, or includes aspects of, the corresponding element described with reference to FIG. 11.

Figure 14:
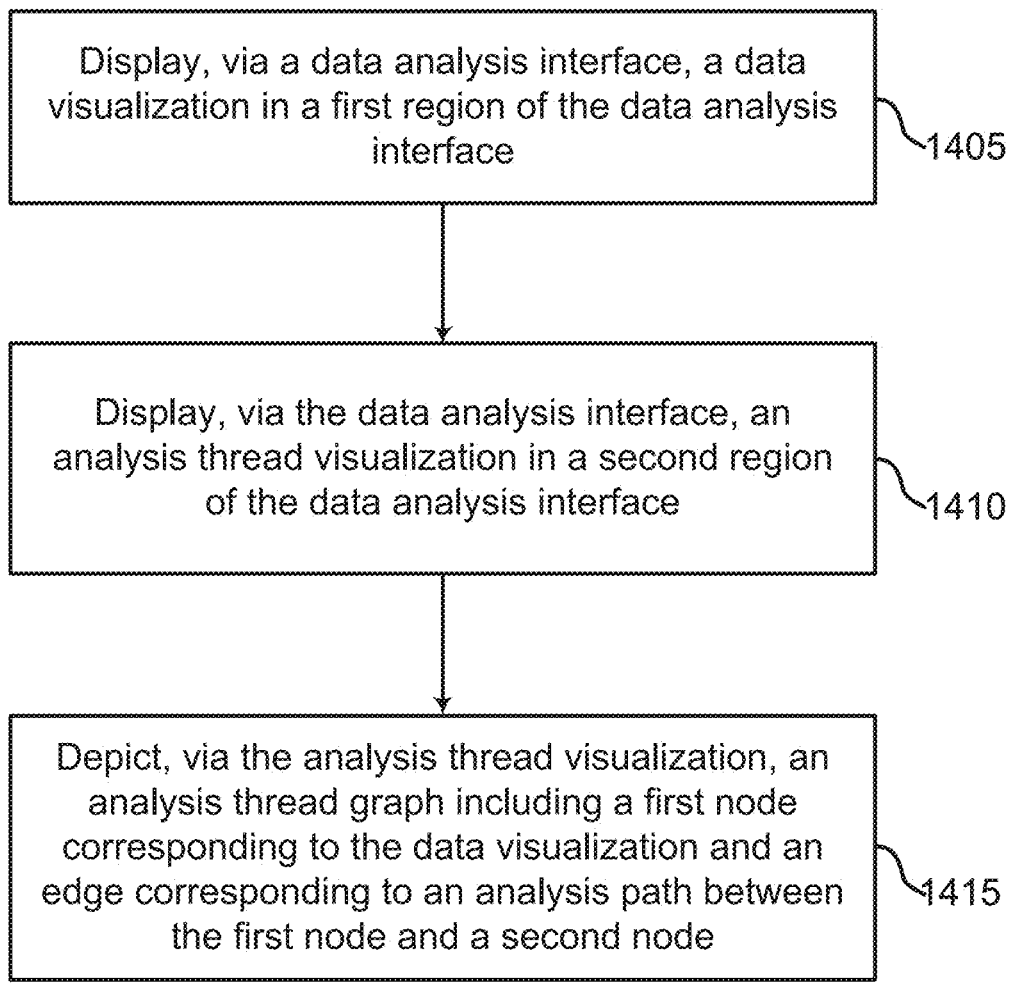
FIG. 14 shows an example of a method for data analysis according to aspects of the present disclosure.

FIG. 14 shows an example of a method for data analysis according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1405, the system displays, via a data analysis interface, a data visualization in a first region of the data analysis interface. In some cases, the operations of this step refer to, or may be performed by, a data analysis interface as described with reference to FIGS. 2, 4-10, and 12.

According to some embodiments, data analysis model 255 (as described with reference to at least FIG. 2) is implemented based on or includes an interactive notebook-based data exploration system. The data analysis interface of data analysis model 255 enables exploratory data analysis. Data analysis model 255 is not dependent on programming skills of users. Instead, the data analysis model generates or predicts follow-up questions based on a seed visualization. To capture the complex and branching hierarchies that result from an organic analysis process, the data analysis model includes an analysis thread visualization (e.g., an analysis thread graph) to summarize the analysis trajectory and to facilitate navigation.

At operation 1410, the system displays, via the data analysis interface, an analysis thread visualization in a second region of the data analysis interface. In some cases, the operations of this step refer to, or may be performed by, a data analysis interface as described with reference to FIGS. 2, 4-10, and 12.

According to an embodiment, data analysis model 255 enables low-code interactive EDA to support users with varying levels of programming skills and facilitate collaboration between them. Low-code interactions let users focus on the data exploration process, rather than coding for an intended task.

According to an embodiment, data analysis model 255 supports quick insight discovery to help users locate the most important and relevant information. Data analysis model 255 can recommend meaningful next-step directions that logically relate to the current data exploration (insights) to help users synthesize compound data insights to better reflect the data story pieces.

According to an embodiment, data analysis model 255 facilitates breadth and depth in data exploration to support iterative analysis of a complex topic as well as a variety of analysis directions. The next-step recommendations from data analysis model 255 incorporate varying levels of analysis, which includes logically-related recommendations and possible drill-down operations that are used to gain more details, and breadth of the analysis, which promotes data coverage by allowing users to create new branches of the data exploration with new data columns, spanning across data entities.

According to an embodiment, data analysis model 255 records and stores the data analysis or data exploration history as a linear stream of separate notebook cells. Data analysis model 255 is configured to make users recall the purpose of a cell without looking into the code. In some cases, the stream of notebook cells is long after a period of data interaction and it is labor intensive to locate the target cell. Data analysis model 255 enables access to the data analysis history, thereby users recall details in the cells and they can run quick back-and-forth navigation.

According to an embodiment, data analysis model 255 enables users to perform multi-thread in-depth data exploration within a single notebook. Data analysis model 255 helps reveal the dependencies between cells, e.g., the analytic structure of data exploration. This representation makes users aware of their exploration status but also contributes to the overall navigation goal.

At operation 1415, the system depicts, via the analysis thread visualization, an analysis thread graph including a first node corresponding to the data visualization and an edge corresponding to an analysis path between the first node and a second node. In some cases, the operations of this step refer to, or may be performed by, a data analysis interface as described with reference to FIGS. 2, 4-10, and 12.

Data analysis apparatus 200 (as described with reference to at least FIG. 2) is configured to generate guidance that is integrated into a computational notebook environment. Hence, data analysis apparatus 200 increases efficiency and awareness of users when performing exploratory data analysis in a low-code manner.

According to an embodiment, data analysis apparatus 200 collects and combines user intent with current data frame to recommend patterns and next steps for data analysis in a nodebook (e.g., Python notebook). Additionally, data analysis model 255 enables users' awareness of structures of analysis thread(s) visualization and dependencies among a set of notebook cells. Data analysis model 255 is configured to display or present multi-thread analysis and distinguish the roles of different nodes. Data analysis model 255 generates data-insight driven recommendation to facilitate low-code data exploration in the notebook environment.

Figure 15:
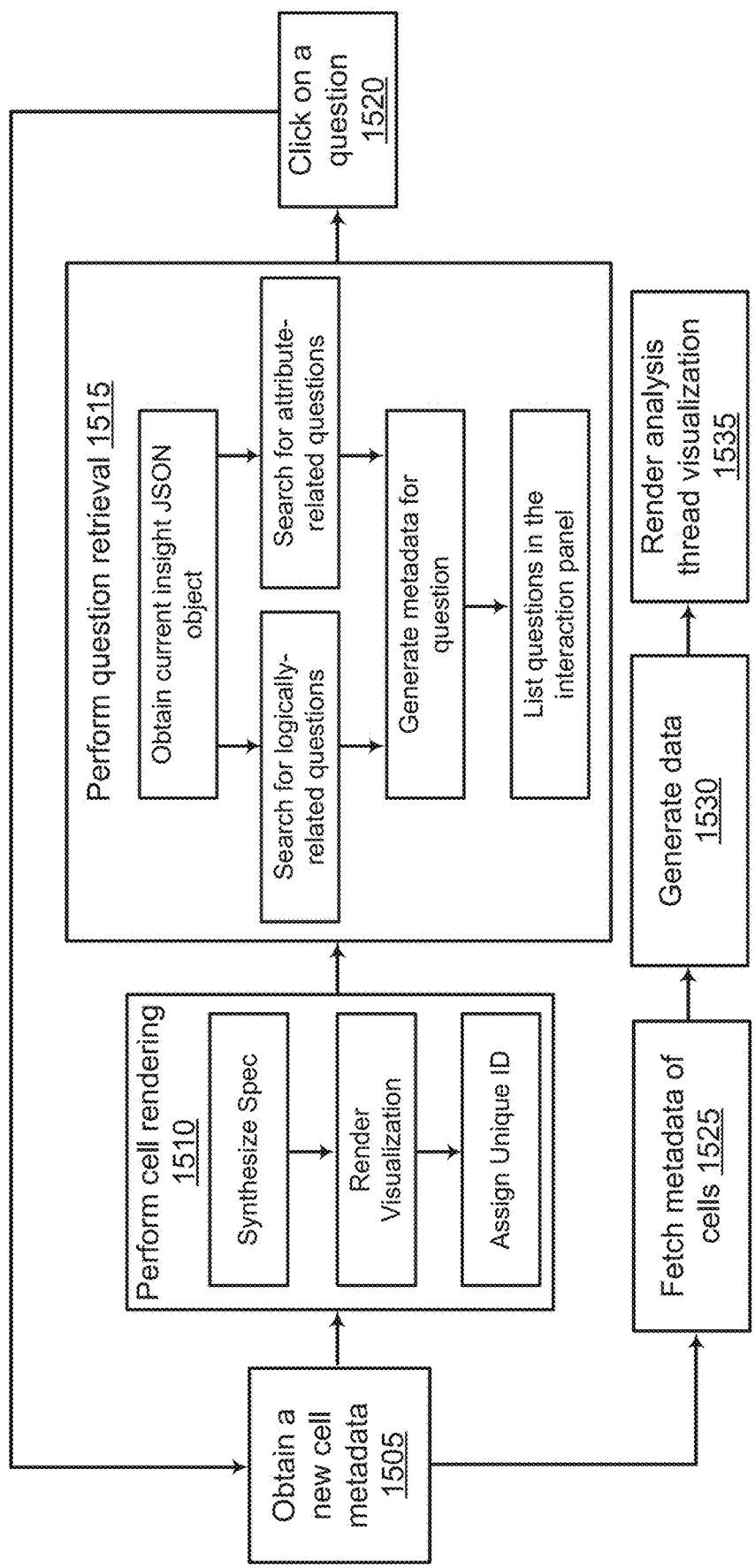
FIG. 15 shows an example of an analysis thread visualization update process according to aspects of the present disclosure.

FIG. 15 shows an example of an analysis thread visualization updating process according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1505, the system obtains a new cell and metadata corresponding to the new cell. In some cases, the operations of this step refer to, or may be performed by, a data analysis model as described with reference to FIG. 2.

According to some embodiments, a method for visualizing data insights includes utilizing a public library, such as the storybook library, as the base of the data analysis model 255 (with reference to FIG. 2). The user interface is implemented similarly compared to online Observable Notebook demos using the React.js library.

At operation 1510, the system performs cell rendering process that involves synthesizing specification, rendering visualization, and assigning unique ID. In some cases, the operations of this step refer to, or may be performed by, a data analysis model as described with reference to FIG. 2. When a new cell is generated, the data analysis model synthesizes a Vega-Lite specification using the cell's metadata, renders the visualization within the cell using Vega-Lite's "embed" function, and assigns a unique ID to the new cell.

At operation 1515, the system performs question retrieval process. In some cases, the operations of this step refer to, or may be performed by, an answer component as described with reference to FIG. 2. The data analysis model extracts the associated data insight and corresponding attribute combination from the cell's metadata, and searches for logically-related and attribute-related insights. For each found insight, the data analysis model creates a JSON object to record its metadata, including the insight itself, the involved attribute combination, a synthesized question, and the ID of its parent cell (i.e., the cell where the click event generating the current cell happened). The data analysis model then wraps and populates these JSON objects into the new cell's interaction panel by showing the list of synthesized questions, and attaches each of them with a click event that leads to another round of the new cell generation process.

TABLE 1

Insight-type-based rules for logically-related insight retrieval.

| Insight Type | Given insight Example | Insight Type | Logically-related Insights Example | Question Type | Converted Question Example |
| --- | --- | --- | --- | --- | --- |
| Extremum | "Cars from the year 80 have lowest average Weight" | Extremum + Correlation | "Cars from the year 80 have lowest average Horsepower" + "Horsepower and Weight have a strong correlation" | Why | "Why Cars from the year 80 have lowest average Weight?" |
| | | Anomalies | "There are three anomalies regarding Weight in the year 80" | | |
| | | Extremum | "Cars from Japan in the year 80 have lowest average weight" | | |
| Correlation | Horsepower and Weight have a strong correlation | Correlation + Correlation | "Weight and Displacement have a strong correlation" + "Horsepower and Displacement have a strong correlation" | Why | "Why Horsepower and Weight have a strong correlation?" |
| Anomalies | "Car "Pontiac Grand Prix" appears to be an outlier regarding Horsepower" | Distribution | "Most values for Horsepower are in the range [75.0, 125.0]" | What | "What is the major value range of Horsepower?" |

TABLE 1-continued

Insight-type-based rules for logically-related insight retrieval.

| Insight Type | Given insight Example | Insight Type | Logically-related Insights Example | Question Type | Converted Question Example |
|---|---|---|---|---|---|
| Distribution | "Most values for Horsepower are in the range [75.0, 125.0]" | Anomalies | "Car"Pontiac Grand Prix" appears to be an outlier regarding Horsepower" | What | "What are potential outliers regarding Horsepower?" |
| | | Distribution | "Most values for Horsepower in the year 80 are in the range [70.0, 120.0]" | What | "What is the distribution of Horsepower in the year 80?" |

Insight types refer to the various types of insights which may be derived from data. Insights are findings or observations which provide new knowledge or understanding, reveal patterns or trends, or identify anomalies or outliers in the data. Different types of data analysis may be performed based on different insight types.

The attribute-related questions are retrieved by obtaining the attribute set of the current cell's insight, searching for insights which share the same data attributes, and converting the insights into questions. According to some embodiments, for logically related questions, the data analysis model first identifies the insights which are logically related to the current insight. The model proposes rules based on the insight-type to search for related insights and convert them into logically related questions. The search process may be put into categories based on the insight types including extremum, correlation, anomaly, and distribution.

For an insight of type extremum which involves a categorical variable $c_1$ and a quantitative variable $q_1$, the data analysis model looks for the existence of three types of logically-related insights: first, an extremum insight involving the same categorical variable $c_1$ and another quantitative variable $q_2$, plus an insight of type correlation between these two quantitative variables $[q_1, q_2]$, second, an anomaly insight with the same variable pair ($c_1$ and $q_1$), and third, an extremum insight involving an additional categorical variable $c_2$, in addition to both $c_1$ and $q_1$. The three types of insight questions provide explanations for the current extremum insight.

For an insight of type correlation which involves two quantitative variables $[q_1, q_2]$, the model identifies two insights of type correlation which involve $[q_1, q_3]$ and $[q_2, q_3]$, respectively, to explain the current insight by introducing another quantitative variable $q_3$.

For an insight of type anomaly, the data analysis model looks for an insight of type distribution involving the same quantitative variable to provide further information about the majority value range.

For an insight of type distribution, the data analysis model looks for first, an insight of type anomaly involving the same quantitative variable to identify potential outliers, and second, another insight of type distribution involving an additional categorical variable to review some drill-down distribution statistics.

For example, given the insight "Cars from the year 1980 have the lowest average horsepower", the data analysis model generates a variety of questions for selection, including logically related questions such as "What might explain the fact that 1980 has the lowest average horsepower?" and attribute-related questions such as "Which item has the lowest horsepower?".

The above rules are designed or customized to support potential reasoning over an observation (a data insight); to allow drill-down analysis for more statistical details by introducing new data attributes; and to reflect low-level analytic tasks proposed in such as Find Anomalies and Correlate. After the search process, the data analysis model uses a template-based method to generate questions from the selected insight statements. There would be multiple questions (generated from multiple insights) to be displayed to users. In some examples, the data analysis model orders questions in the interaction panel as follows: (1) logically-related questions have higher priority than attribute-related questions, and (2) attribute-related questions are ordered according to the importance level recorded in the corresponding insight JSON object. The overall question retrieval process is summarized in the algorithm of FIG. 16, where insightSearch( ) and questionConvertor( ) correspond to searching logically-related in-sights and converting insights into the question format.

At operation 1520, the user clicks on a question. In some cases, the operations of this step refer to, or may be performed by, a user as described with reference to FIG. 1. From the user side, when a cell is rendered, they first see the output visualization inside the cell; they can view questions raised from the current cell's content by opening the interaction panel and clicking on any of them to have a new cell rendered to explore further.

At operation 1525, the system fetches metadata of a set of cells. In some cases, the operations of this step refer to, or may be performed by, a data analysis model as described with reference to FIG. 2.

At operation 1530, the system generates data. In some cases, the operations of this step refer to, or may be performed by, a data analysis model as described with reference to FIG. 2.

At operation 1535, the system renders analysis thread visualization. In some cases, the operations of this step refer to, or may be performed by, a graph component as described with reference to FIG. 2. The analysis thread visualization is implemented using the d3.tree( ) function and is updated in real-time with React's useEffect hook which monitors changes of the notebook cells. d3.tree( ) requires a specific input data format. The treeDataGenerator( ) function is used to obtain the data of the required format. When a new node is rendered, treeDataGenerator( ) immediately fetches metadata of all notebook cells and generates a nested JSON data object recording each node's ID and children. The analysis thread visualization is then updated by rerunning the drawing code script with the new data. When a notebook cell is deleted, the data analysis model marks the cell as deleted. The data analysis model disables its rendering in the notebook environment and updates the analysis thread visualization with the corresponding node being greyed out. The hover and click events of each node are implemented with d3 event handler.

For the hover event, the data analysis model first obtains the ID of the hovered node from the data provided by treeData-Generator( ) function, locates its corresponding notebook cell and extracts its Vega-Lite specification, and renders a smaller version of the visualization using Vega-Lite's "embed" function inside a d3 tooltip that is placed right next to the node. For the click event, the system obtains the ID of the clicked node, fetches its vertical screen offset, and places the node in the middle of the screen with the window.scrollTo( ) API.

In an embodiment, a user may remove a cell that is considered unnecessary. Directly deleting its corresponding nodes in the analysis thread visualization is not optimal because the node may have children which the user still wants to maintain in the notebook, and it would be difficult to restore this deleted cell later as the place would be otherwise lost in the hierarchical flow of analysis states. Instead, the data analysis model, via the analysis thread visualization, can temporarily grey out the node for the deleted cell to indicate its archive status and maintain its children nodes (if any). The user can restore a deleted cell by clicking its corresponding node and selecting "restore this cell".

The node interactions for the analysis thread visualization can facilitate navigation between cells. This interaction helps the user to quickly recall what a cell contains and jump between different threads of data analysis. In an embodiment, hover interaction enables the user to hover over nodes in the analysis thread visualization to view a smaller version of the output visualization for the corresponding notebook cell as a tooltip. This design visually reinforces the correspondence between notebook cells and tree nodes, reminds the user of the content in the hovered cell before interacting with it further, and supports easily browsing the exploration history.

In an embodiment, click interaction enables the user to select a node in the analysis thread visualization to jump to the corresponding cell in the notebook with its interaction panel open. Combined with hover, the user can quickly browse existing cells, locate a target cell, and immediately go to that cell to continue the analysis and exploration process without laboriously scrolling through the long list of cells directly.

In some embodiments, the data analysis model includes analysis thread visualization as a navigation helper. It presents both high-level information (overall structure of the data analysis threads) and low-level details (the visualization(s) in a cell). The analysis thread visualization shows easy-to-use interaction features to help users navigate among cells efficiently.

FIG. 16 shows an example of a question retrieval algorithm 1600 according to aspects of the present disclosure. The data analysis model implements question retrieval via algorithm 1600. Input data to the data analysis model is the current insight cIn and the insight set InSet. The result from the model is a retrieved set of questions questionSet.

At line 1, algorithm 1600 is executed to run insightSearch (cIn, InSet) based on Table 1. The outcome from insight-Search is assigned to lgInSet. At line 2, an empty list { } is assigned to atInSet. At line 3, algorithm 900 is executed to run {atComb|atComb∩cIn.attributes≠∅}. The outcome is assigned to atComb. For lines 4 to 5, algorithm 1600 is executed to run a for loop. At line 4, for atComb∈atCombs do the following. At line 5, algorithm 1600 is executed to run atInSet ∪{in|in∈InSet & in.attributes=atComb}. The outcome is assigned to atInSet. The for loop ends. At line 6, algorithm 1600 is executed to run questionConvertor (lgIn-Set). The outcome is assigned to questionSet. At lines 7 to 9, algorithm 1600 is executed to run another for loop. At line 7, for level ∈[1,2,3] do the following. At the line 8, algorithm 1600 is executed to run {in|in∈atInSet & in.tier=level}. The outcome is assigned to thisLvSet. At line 9, algorithm 1600 is executed to run questionSet ∪ questionConvertor (thisLvSet). The for loop ends.

Figure 17:
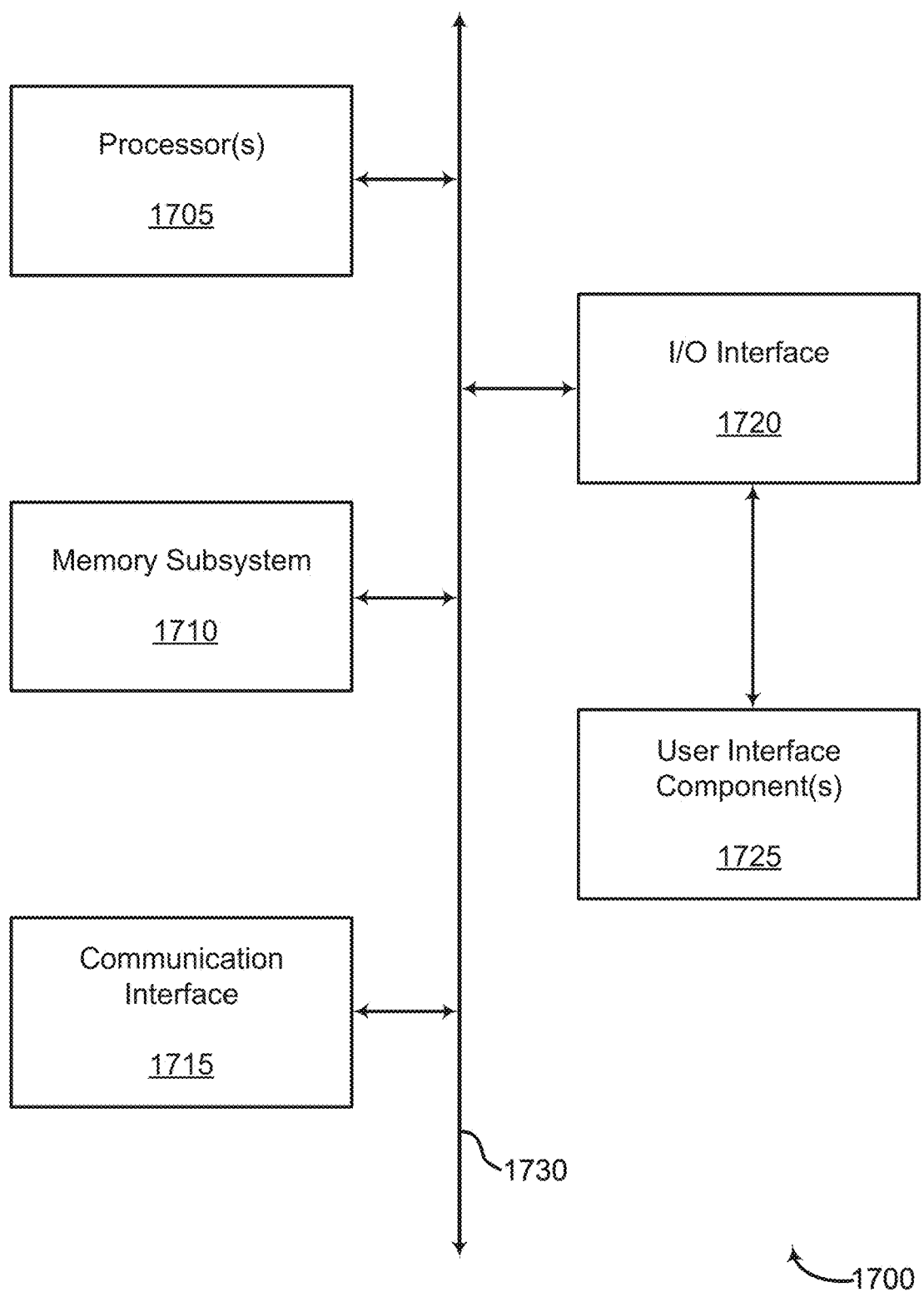
FIG. 17 shows an example of a computing device according to aspects of the present disclosure.

FIG. 17 shows an example of a computing device 1700 for data analysis according to aspects of the present disclosure. The example shown includes computing device 1700, processor(s) 1705, memory subsystem 1710, communication interface 1715, I/O interface 1720, user interface component(s) 1725, and channel 1730. In one embodiment, computing device 1700 includes processor(s) 1705, memory subsystem 1710, communication interface 1715, I/O interface 1720, user interface component(s) 1725, and channel 1730. In some embodiments, computing device 1700 is an example of, or includes aspects of, data analysis apparatus 200 of FIG. 2. In some embodiments, computing device 1700 includes one or more processors 1705 that can execute instructions stored in memory subsystem 1710 to display, via a data analysis interface, a data visualization in a first region of the data analysis interface; and display, via the data analysis interface, an analysis thread visualization in a second region of the data analysis interface, where the analysis thread visualization depicts an analysis thread graph including a first node corresponding to the data visualization and an edge corresponding to an analysis path between the first node and a second node.

According to some aspects, computing device 1700 includes one or more processors 1705. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof. In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, memory subsystem 1710 includes one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, communication interface 1715 operates at a boundary between communicating entities (such as computing device 1700, one or more user devices, a cloud, and one or more databases) and channel 1730 and can record and process communications. In some cases, communication interface 1715 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1720 is controlled by an I/O controller to manage input and output signals for computing device 1700. In some cases, I/O interface 1720 manages peripherals not integrated into computing device 1700. In some cases, I/O interface 1720 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1720 or via hardware components controlled by the I/O controller.

According to some aspects, user interface component(s) 1725 enable a user to interact with computing device 1700. In some cases, user interface component(s) 1725 include an audio device, such as an external speaker system, an external display device such as a display screen, an input device (e.g., a remote control device interfaced with a user interface directly or through the I/O controller), or a combination thereof. In some cases, user interface component(s) 1725 include a GUI.

Performance of apparatus, systems and methods of the present disclosure have been evaluated, and results indicate embodiments of the present disclosure have obtained increased performance over existing technology. Example experiments demonstrate that the data analysis apparatus outperforms conventional systems.

The data analysis apparatus described in the present disclosure has been analyzed and compared to systems using Cognitive Dimensions of Notations (CDN) framework, showing advantages and benefits disclosed in the present disclosure. One or more embodiments of the present disclosure can be applied to the fields of interactive notebooks, exploratory data analysis, and visual recommendation.

The Cognitive Dimensions of Notations are a framework for evaluating the usability of information-based systems. It can be used to assess the effectiveness of programming languages and visual interfaces. Experiments and evaluation are directed at five cognitive dimensions and they are viscosity, visibility, hidden dependencies, premature commitment, and provisionally. These dimensions measure the aspects of a system that are most related to the exploratory data analysis process of users, and span a valid dimension space for data exploration.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
displaying, via a data analysis interface, a data visualization in a first region of the data analysis interface;
displaying, via the data analysis interface, an analysis thread visualization in a second region of the data analysis interface, wherein the analysis thread visualization depicts an analysis thread graph including a first node corresponding to the data visualization and an edge corresponding to an analysis path between the first node and a second node; and
displaying, via the data analysis interface, a plurality of queries in a third region of the data analysis interface.

2. The method of claim 1, wherein:
the analysis thread graph comprises an additional edge corresponding to an additional analysis path between the first node and a third node, wherein the third node comprises a sibling node of the second node.

3. The method of claim 1, wherein:
the plurality of queries includes a query requesting additional data about an element of the data visualization.

4. The method of claim 1, wherein:
the plurality of queries includes a query corresponding to the second node.

5. The method of claim 4, further comprising:
receiving user input selecting the query corresponding to the second node; and
displaying an additional data visualization corresponding to the second node based on the user input.

6. The method of claim 1, further comprising:
receiving user input selecting a query from the plurality of queries; and
generating an additional data visualization corresponding to the query.

7. The method of claim 6, further comprising:
identifying a dataset corresponding to the data visualization; and
transforming the dataset based on the query, wherein the additional data visualization is based on the transformed dataset.

8. The method of claim 6, further comprising:
adding a third node to the analysis thread graph based on the user input.

9. The method of claim 6, further comprising:
generating an answer to the query based on the user input.

10. The method of claim 1, further comprising:
identifying a dataset corresponding to the data visualization; and
generating the plurality of queries based on the dataset.

11. The method of claim 1, further comprising:
receiving a user input indicating the second node of the analysis thread graph via the analysis thread visualization; and
displaying an additional data visualization corresponding to the second node based on the user input.

12. A non-transitory computer readable medium storing code for data analytics, the code comprising instructions executable by a processor to:
generate an analysis thread graph including a first node corresponding to a data visualization and an edge corresponding to an analysis path between the first node and a second node;
receive user input identifying the second node;
select an additional data visualization corresponding to the second node based on the user input;
display the data visualization in a first region of a data analysis interface; and
display an analysis thread visualization in a second region of the data analysis interface.

13. The non-transitory computer readable medium of claim 12, the code further comprising instructions executable by the processor to:
display a plurality of queries in a third region of the data analysis interface.

14. An apparatus comprising:
at least one processor;
at least one memory storing instructions executable by the at least one processor;
a graph component configured to generate an analysis thread graph including a first node corresponding to a data visualization and an edge corresponding to an analysis path between the first node and a second node;
a data analysis interface configured to display the data visualization in a first region of the data analysis interface and an analysis thread visualization in a second region of the data analysis interface; and
a navigation component configured to receive user input identifying the second node and to select an additional data visualization corresponding to the second node based on the user input.

15. The apparatus of claim 14, further comprising:
a query component configured to identify a dataset corresponding to the data visualization and to generate a plurality of queries based on the dataset.

16. The apparatus of claim 14, further comprising:
an answer component configured to generate an answer to a query based on another user input.

17. The apparatus of claim 14, further comprising:
a visualization component configured to transform a dataset to obtain a transformed dataset, and to generate the data visualization based on the transformed dataset.

* * * * *